United States Patent
Ohyama et al.

(10) Patent No.: US 6,996,278 B2
(45) Date of Patent: Feb. 7, 2006

(54) CODING AND DECODING METHOD AND DEVICE ON MULTI-LEVEL IMAGE

(75) Inventors: Maki Ohyama, Kanagawa (JP); Hiroyuki Kawamoto, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 781 days.

(21) Appl. No.: 10/098,413

(22) Filed: Mar. 18, 2002

(65) Prior Publication Data

US 2002/0191694 A1 Dec. 19, 2002

(30) Foreign Application Priority Data

| Mar. 19, 2001 | (JP) | ............................. 2001-077425 |
| Mar. 21, 2001 | (JP) | ............................. 2001-080575 |
| Aug. 16, 2001 | (JP) | ............................. 2001-246878 |
| Mar. 14, 2002 | (JP) | ............................. 2002-070979 |

(51) Int. Cl.
    *G06K 9/00* (2006.01)
(52) U.S. Cl. ...................... 382/232; 382/233; 382/264; 382/266
(58) Field of Classification Search ................ 382/232, 382/233, 264, 266, 242; 358/447, 539; 345/421
    See application file for complete search history.

(56) References Cited

U.S. PATENT DOCUMENTS 5,790,269 A * 8/1998 Masaki et al. .............. 358/447
5,844,718 A * 12/1998 Ohsawa et al. ............. 358/539
5,917,956 A * 6/1999 Ohsawa et al. ............. 382/266

FOREIGN PATENT DOCUMENTS

JP    2-122767    5/1990

OTHER PUBLICATIONS

Paul et al., "Some Experimental Results in Adaptive Prediction DPCM Coidng of Images", IEEE vol. 8, Apr. 1983, pps. 1220-1223.*

* cited by examiner

*Primary Examiner*—Anh Hong Do
(74) *Attorney, Agent, or Firm*—Dickstein Shapiro Morin & Oshinsky LLP

(57) ABSTRACT

A coding and decoding method includes the step of a) classifying an input multi-level image into edge parts and non-edge parts according to edge degree thereof; b) coding the input multi-level image according to a coding scheme different between the edge parts and non-edge parts; and c) decoding coded data according to a linear interpolation scheme, a cubic-function convolution scheme or an interpolation scheme having smoothing performance for generating pixel values included in the non-edge part.

34 Claims, 31 Drawing Sheets

LOW-PASS FILTER (L)
   L=(a+b+c+d)/4

HIGH-PASS FILTER(H1,H2,H3)
   H1=(a+c)/2-(b+d)/2
   H2=(a+b)/2-(c+d)/2
   H3=(a-b)-(c-d)

| 1 | -2 | -6 | -2 | 1 |
|---|----|----|----|---|
| -2 | 4 | 12 | 4 | -2 |
| -6 | 12 | 36 | 12 | -6 |
| -2 | 4 | 12 | 4 | -2 |
| 1 | -2 | -6 | -2 | 1 |

FIG.22

| SUB/MAIN | 0 | 25 | 50 | 75 | 100 | 125 | 150 | 175 | 200 | 225 | 250 | 275 | 300 | 600dpi |
|---|---|---|---|---|---|---|---|---|---|---|---|---|---|---|
|  | 0 | 1 | 2 | 3 | 4 | 5 | 6 | 7 | 8 | 9 | 10 | 11 | 12 |  |
| 0 / 0 | 1.00 | 1.02 | 1.06 | 1.10 | 1.13 | 1.10 | 1.00 | 0.84 | 0.63 | 0.40 | 0.19 | 0.05 | 0.00 |  |
| 25 / 1 | 1.02 | 1.03 | 1.08 | 1.12 | 1.14 | 1.11 | 1.02 | 0.85 | 0.64 | 0.40 | 0.20 | 0.05 | 0.00 |  |
| 50 / 2 | 1.06 | 1.08 | 1.12 | 1.17 | 1.19 | 1.16 | 1.06 | 0.89 | 0.66 | 0.42 | 0.20 | 0.05 | 0.00 |  |
| 75 / 3 | 1.10 | 1.12 | 1.17 | 1.22 | 1.24 | 1.21 | 1.10 | 0.92 | 0.69 | 0.44 | 0.21 | 0.06 | 0.00 |  |
| 100 / 4 | 1.13 | 1.14 | 1.19 | 1.24 | 1.27 | 1.23 | 1.13 | 0.94 | 0.70 | 0.45 | 0.22 | 0.06 | 0.00 |  |
| 125 / 5 | 1.10 | 1.11 | 1.16 | 1.21 | 1.23 | 1.20 | 1.10 | 0.92 | 0.68 | 0.43 | 0.21 | 0.06 | 0.00 |  |
| 150 / 6 | 1.00 | 1.02 | 1.06 | 1.10 | 1.13 | 1.10 | 1.00 | 0.84 | 0.63 | 0.40 | 0.19 | 0.05 | 0.00 |  |
| 175 / 7 | 0.84 | 0.85 | 0.89 | 0.92 | 0.94 | 0.92 | 0.84 | 0.70 | 0.52 | 0.33 | 0.16 | 0.04 | 0.00 |  |
| 200 / 8 | 0.63 | 0.64 | 0.66 | 0.69 | 0.70 | 0.68 | 0.63 | 0.52 | 0.39 | 0.25 | 0.12 | 0.03 | 0.00 |  |
| 225 / 9 | 0.40 | 0.40 | 0.42 | 0.44 | 0.45 | 0.43 | 0.40 | 0.33 | 0.25 | 0.16 | 0.08 | 0.02 | 0.00 |  |
| 250 / 10 | 0.19 | 0.20 | 0.20 | 0.21 | 0.22 | 0.21 | 0.19 | 0.16 | 0.12 | 0.08 | 0.04 | 0.01 | 0.00 |  |
| 275 / 11 | 0.05 | 0.05 | 0.05 | 0.06 | 0.06 | 0.06 | 0.05 | 0.04 | 0.03 | 0.02 | 0.01 | 0.00 | 0.00 |  |
| 300 / 12 | 0.00 | 0.00 | 0.00 | 0.00 | 0.00 | 0.00 | 0.00 | 0.00 | 0.00 | 0.00 | 0.00 | 0.00 | 0.00 |  |
| 600dpi |  |  |  |  |  |  |  |  |  |  |  |  |  |  |

FIG.24

| SUB/MAIN | 0 | 25 | 50 | 75 | 100 | 125 | 150 | 175 | 200 | 225 | 250 | 275 | 300 | 600dpi |
|---|---|---|---|---|---|---|---|---|---|---|---|---|---|---|
| | 0 | 1 | 2 | 3 | 4 | 5 | 6 | 7 | 8 | 9 | 10 | 11 | 12 | |
| 0 | 0 | 1.00 | 1.00 | 1.00 | 1.00 | 1.00 | 1.00 | 0.00 | 0.00 | 0.00 | 0.00 | 0.00 | 0.00 | |
| 25 | 1 | 1.00 | 1.00 | 1.00 | 1.00 | 1.00 | 1.00 | 0.00 | 0.00 | 0.00 | 0.00 | 0.00 | 0.00 | |
| 50 | 2 | 1.00 | 1.00 | 1.00 | 1.00 | 1.00 | 1.00 | 0.00 | 0.00 | 0.00 | 0.00 | 0.00 | 0.00 | |
| 75 | 3 | 1.00 | 1.00 | 1.00 | 1.00 | 1.00 | 1.00 | 0.00 | 0.00 | 0.00 | 0.00 | 0.00 | 0.00 | |
| 100 | 4 | 1.00 | 1.00 | 1.00 | 1.00 | 1.00 | 1.00 | 0.00 | 0.00 | 0.00 | 0.00 | 0.00 | 0.00 | |
| 125 | 5 | 1.00 | 1.00 | 1.00 | 1.00 | 1.00 | 1.00 | 0.00 | 0.00 | 0.00 | 0.00 | 0.00 | 0.00 | |
| 150 | 6 | 1.00 | 1.00 | 1.00 | 1.00 | 0.00 | 0.00 | 0.00 | 0.00 | 0.00 | 0.00 | 0.00 | 0.00 | |
| 175 | 7 | 0.00 | 0.00 | 0.00 | 0.00 | 0.00 | 0.00 | 0.00 | 0.00 | 0.00 | 0.00 | 0.00 | 0.00 | |
| 200 | 8 | 0.00 | 0.00 | 0.00 | 0.00 | 0.00 | 0.00 | 0.00 | 0.00 | 0.00 | 0.00 | 0.00 | 0.00 | |
| 225 | 9 | 0.00 | 0.00 | 0.00 | 0.00 | 0.00 | 0.00 | 0.00 | 0.00 | 0.00 | 0.00 | 0.00 | 0.00 | |
| 250 | 10 | 0.00 | 0.00 | 0.00 | 0.00 | 0.00 | 0.00 | 0.00 | 0.00 | 0.00 | 0.00 | 0.00 | 0.00 | |
| 275 | 11 | 0.00 | 0.00 | 0.00 | 0.00 | 0.00 | 0.00 | 0.00 | 0.00 | 0.00 | 0.00 | 0.00 | 0.00 | |
| 300 | 12 | 0.00 | 0.00 | 0.00 | 0.00 | 0.00 | 0.00 | 0.00 | 0.00 | 0.00 | 0.00 | 0.00 | 0.00 | |
| 600dpi | | | | | | | | | | | | | | |

FIG.27

| 0 | 1 | 0 | -5 | -8 | -5 | 0 | 1 | 0 |
|---|---|---|----|----|----|---|---|---|
| 0 | 0 | 0 | 0  | 0  | 0  | 0 | 0 | 0 |
| 0 | -5 | 0 | 25 | 40 | 25 | 0 | -5 | 0 |
| 0 | -8 | 0 | 40 | 64 | 40 | 0 | -8 | 0 |
| 0 | -5 | 0 | 25 | 40 | 25 | 0 | -5 | 0 |
| 0 | 0 | 0 | 0  | 0  | 0  | 0 | 0 | 0 |
| 0 | 1 | 0 | -5 | -8 | -5 | 0 | 1 | 0 |

FIG.28

| SUB/MAIN | | 0 | 25 | 50 | 75 | 100 | 125 | 150 | 175 | 200 | 225 | 250 | 275 | 300 | 600dpi |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | |
| 0 | 0 | 1.00 | 1.02 | 1.04 | 1.03 | 0.94 | 0.75 | 0.50 | 0.25 | 0.06 | 0.03 | 0.04 | 0.02 | 0.00 | |
| 25 | 1 | 1.02 | 1.03 | 1.06 | 1.05 | 0.95 | 0.76 | 0.51 | 0.25 | 0.06 | 0.03 | 0.04 | 0.02 | 0.00 | |
| 50 | 2 | 1.04 | 1.06 | 1.08 | 1.07 | 0.98 | 0.78 | 0.52 | 0.26 | 0.07 | 0.03 | 0.04 | 0.02 | 0.00 | |
| 75 | 3 | 1.03 | 1.05 | 1.07 | 1.06 | 0.97 | 0.77 | 0.52 | 0.26 | 0.06 | 0.03 | 0.04 | 0.02 | 0.00 | |
| 100 | 4 | 0.94 | 0.95 | 0.98 | 0.97 | 0.88 | 0.70 | 0.47 | 0.23 | 0.06 | 0.03 | 0.04 | 0.01 | 0.00 | |
| 125 | 5 | 0.75 | 0.76 | 0.78 | 0.77 | 0.70 | 0.56 | 0.38 | 0.19 | 0.05 | 0.02 | 0.03 | 0.01 | 0.00 | |
| 150 | 6 | 0.50 | 0.51 | 0.52 | 0.52 | 0.47 | 0.38 | 0.25 | 0.12 | 0.03 | 0.02 | 0.02 | 0.01 | 0.00 | |
| 175 | 7 | 0.25 | 0.25 | 0.26 | 0.26 | 0.23 | 0.19 | 0.12 | 0.06 | 0.02 | 0.01 | 0.01 | 0.00 | 0.00 | |
| 200 | 8 | 0.06 | 0.06 | 0.07 | 0.06 | 0.06 | 0.05 | 0.03 | 0.02 | 0.00 | 0.00 | 0.00 | 0.00 | 0.00 | |
| 225 | 9 | 0.03 | 0.03 | 0.03 | 0.03 | 0.03 | 0.02 | 0.02 | 0.01 | 0.00 | 0.00 | 0.00 | 0.00 | 0.00 | |
| 250 | 10 | 0.04 | 0.04 | 0.04 | 0.04 | 0.04 | 0.03 | 0.02 | 0.01 | 0.00 | 0.00 | 0.00 | 0.00 | 0.00 | |
| 275 | 11 | 0.02 | 0.02 | 0.02 | 0.02 | 0.01 | 0.01 | 0.01 | 0.00 | 0.00 | 0.00 | 0.00 | 0.00 | 0.00 | |
| 300 | 12 | 0.00 | 0.00 | 0.00 | 0.00 | 0.00 | 0.00 | 0.00 | 0.00 | 0.00 | 0.00 | 0.00 | 0.00 | 0.00 | |
| 600dpi | | | | | | | | | | | | | | | |

FIG.29

| 1 | 2 | 4  | 2 | 1 |
|---|---|----|---|---|
| 2 | 4 | 8  | 4 | 2 |
| 4 | 8 | 16 | 8 | 4 |
| 2 | 4 | 8  | 4 | 2 |
| 1 | 2 | 4  | 2 | 1 |

FIG.30

| SUB/MAIN | 0 | 25 | 50 | 75 | 100 | 125 | 150 | 175 | 200 | 225 | 250 | 275 | 300 | 600dpi |
|---|---|---|---|---|---|---|---|---|---|---|---|---|---|---|
|  | 0 | 1 | 2 | 3 | 4 | 5 | 6 | 7 | 8 | 9 | 10 | 11 | 12 |  |
| 0 | 0 | 1.00 | 0.96 | 0.85 | 0.68 | 0.50 | 0.33 | 0.20 | 0.12 | 0.10 | 0.12 | 0.15 | 0.19 | 0.20 |
| 25 | 1 | 0.96 | 0.92 | 0.81 | 0.66 | 0.48 | 0.32 | 0.19 | 0.12 | 0.10 | 0.11 | 0.15 | 0.18 | 0.19 |
| 50 | 2 | 0.85 | 0.81 | 0.72 | 0.58 | 0.42 | 0.28 | 0.17 | 0.10 | 0.08 | 0.10 | 0.13 | 0.16 | 0.17 |
| 75 | 3 | 0.68 | 0.66 | 0.58 | 0.47 | 0.34 | 0.23 | 0.14 | 0.08 | 0.07 | 0.08 | 0.10 | 0.13 | 0.14 |
| 100 | 4 | 0.50 | 0.48 | 0.42 | 0.34 | 0.25 | 0.17 | 0.10 | 0.06 | 0.05 | 0.06 | 0.08 | 0.09 | 0.10 |
| 125 | 5 | 0.33 | 0.32 | 0.28 | 0.23 | 0.17 | 0.11 | 0.07 | 0.04 | 0.03 | 0.04 | 0.05 | 0.06 | 0.07 |
| 150 | 6 | 0.20 | 0.19 | 0.17 | 0.14 | 0.10 | 0.07 | 0.04 | 0.02 | 0.02 | 0.02 | 0.03 | 0.04 | 0.04 |
| 175 | 7 | 0.12 | 0.12 | 0.10 | 0.08 | 0.06 | 0.04 | 0.02 | 0.02 | 0.01 | 0.01 | 0.02 | 0.02 | 0.02 |
| 200 | 8 | 0.10 | 0.10 | 0.08 | 0.07 | 0.05 | 0.03 | 0.02 | 0.01 | 0.01 | 0.01 | 0.02 | 0.02 | 0.02 |
| 225 | 9 | 0.12 | 0.11 | 0.10 | 0.08 | 0.06 | 0.04 | 0.02 | 0.01 | 0.01 | 0.01 | 0.02 | 0.02 | 0.02 |
| 250 | 10 | 0.15 | 0.15 | 0.13 | 0.10 | 0.08 | 0.05 | 0.03 | 0.02 | 0.02 | 0.02 | 0.02 | 0.03 | 0.03 |
| 275 | 11 | 0.19 | 0.18 | 0.16 | 0.13 | 0.09 | 0.06 | 0.04 | 0.02 | 0.02 | 0.02 | 0.02 | 0.03 | 0.04 |
| 300 | 12 | 0.20 | 0.19 | 0.17 | 0.14 | 0.10 | 0.07 | 0.04 | 0.02 | 0.02 | 0.02 | 0.03 | 0.04 | 0.04 |
| 600dpi |  |  |  |  |  |  |  |  |  |  |  |  |  |  |

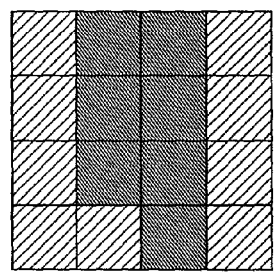
Max = 153
Min = 12
TH = (153+12)/2 = 82
A-low=(14+12+17+24+78+81+72+64+54)/9
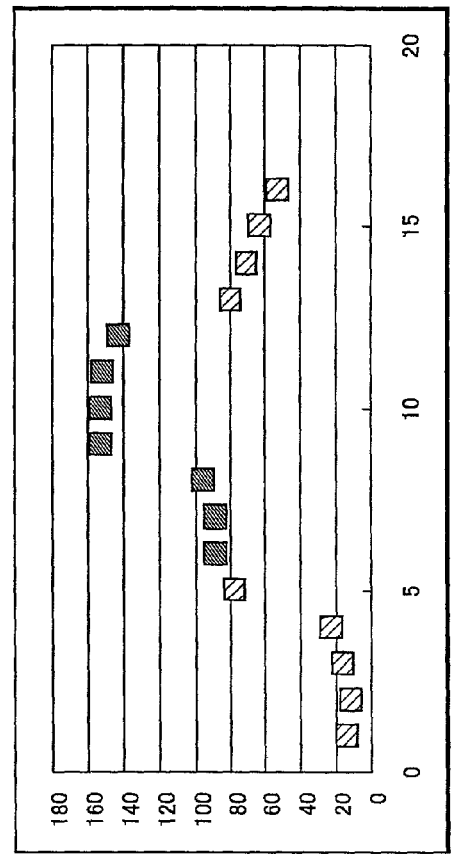
FIG.33A
FIG.33B
FIG.33C

| Value | PREDETERMINED PARAMETER |
| TH | (Max−Min)÷2 |
| TH2 | TH−Value |

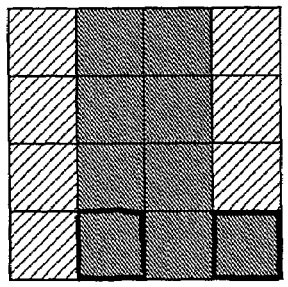
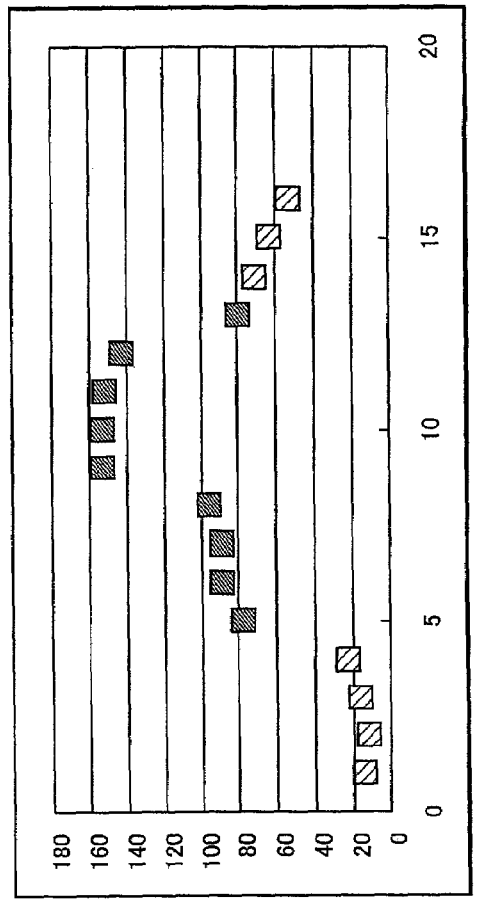
$Max = 153$
$Min = 12$
$TH = (153+12)/2 = 82$
$TH2 = (153+12)/2 = 82-10 = 72$
$A\text{-low} = (14+12+17+24+78+81+72+64+54)/9$
FIG.36A
FIG.36B
FIG.36C

CODING AND DECODING METHOD AND DEVICE ON MULTI-LEVEL IMAGE

BACKGROUND OF THE INVENTION

1. Field of the Invention

The present invention relates to coding and decoding method and device, and, in particular, coding and decoding method and device on multi-level images, in a digital copying machine or the like, especially for the purpose of image compression and decompression

2. Description of the Related Art

There are tendencies, such as improving the resolution in digital apparatus in recent years for providing high-definition images and increasing the number of gray scale levels thereon. This results in an effect of improving image quality, but thereby, the amount of information to be processed increases accordingly. In fact, as an image of the 256 gray scale levels of monochrome is discussed, the information amount 8 times a case of two gray scale levels (black and white) should be processed. Accordingly, a storage capacity needed in order to memorize the image as a result becomes also 8 times, and, thus, the cost of image-processing apparatus will increase accordingly.

Then, a scheme of coding (compressing) image data is usually applied for reducing the size of the necessary storage capacity. The coding scheme is roughly classified into a variable-length coding and fixed-length coding in terms of a code word length obtained after the coding. The former scheme has a feature such that coding efficiency is high, and also, lossless compression is achieved. On the other hand, according to the second scheme, i.e., the fixed-length coding, since a position on an image before coding can be recognized after the coding. Thereby, it is possible to reproduce only image of arbitrary portions from the coded data. Accordingly, the former is suitable for apparatus like a facsimile machine from these features, and the latter is suitable for an apparatus for which image processing/manipulation/modification is required, such as a copying machine, etc.

The fixed-length coding scheme suitable for a copying machine etc. will now be discussed. In this scheme, the easiest way is to fix the length of code word assigned to 1 pixel. For example, a 2-bit-per-1-pixel code word is applied to 1 pixel originally having 8 bits. However, by this way, a partial feature which an original image has cannot necessarily be reflected by the thus-obtained code. Since, in other words, an important image region and an image region which is not so cannot be distinguished in coding scheme, quality of image may be degraded as a result of the coding.

In order to improve the quality of image, the number of bits assigned to 1 pixel must be increased, but, thereby, the coding efficiency becomes bad. Moreover, a region of characters, a region of a natural image, etc. may be mixed in one page of image, in some cases. In such a case, when various these regions having different features are processed by the same coding scheme, the original image information is not kept but the image quality may be deteriorated.

SUMMARY OF THE INVENTION

The present invention aims at providing image coding and decoding method and device in which the quality of an original image is maintainable, while, the coding efficiency can be improved.

In order to solve the above-mentioned problem, the present inventors proposed the following method in Japanese laid-open patent application No. 2000-274381, previously. By this method, an input multi-value image is divided into rectangle block regions of a predetermined size, predetermined frequency transform is performed on these block regions, and it is determined whether, as compared with a threshold, edge components exist in the thus-obtained transform coefficients. For the portions determined to be non-edge parts as a result, the average density/shade of the block concerned is calculated and is used as code data as it is, while a maximum-and-minimum average approximating method is applied for the portions determined as being edge parts.

However, there are the following problems by this method. That is, for such an image made of halftone dots/spots, for example, edge parts and non-edge parts occur periodically. As a result, Moiré may occur due to spatial frequency difference between the rectangular block applied cycles and the cycles of halftone dots. It is possible to control the above-mentioned threshold, as disclosed in the above-mentioned publication, for solution of this problem. Thereby, it is possible to prevent image degradation generated in block boundary lines of the rectangular blocks. However, occurrence of Moiré cannot still be prevented completely.

Then, according to the present invention, a linear interpolation method, cubic-function convolution interpolation method, or interpolation method having a smoothing function is applied especially for non-edge parts in case of decoding the coded data. Consequently, halftone dots of the input image can be reproduced effectively, while Moiré can be prevented, and a high definition image can be reproduced.

Moreover, when a picture regarding image processing mode is set up, it is preferable to apply a decoding scheme for non-edge regardless of the edge/non-edge determination result. Consequently, a halftone-dot image, such as a photograph, can be reproduced effectively, while Moiré is avoided, and thus, a high-definition image can be obtained.

Moreover, it is preferable to control coding scheme, preferably as well as decoding scheme similarly, according to a result of classification as to whether or not each image part corresponds to a halftone-dot part or non-halftone-dot part. Consequently, as a result of employing halftone-dot classification, in comparison to a case only determination result as to edge/non-edge is used, according to the characteristics/features of the input image, fine control can be made on the coding scheme and decoding scheme, and, also, Moiré can be prevented still more effectively, and a high-definition image can be reproduced.

BRIEF DESCRIPTION OF THE DRAWINGS

Other objects and further features of the present invention will become more apparent from the following detailed description when read in conjunction with the following accompanying drawings:

FIGS. 5A, 5B and 5C illustrate operation of a coding part in the configuration of FIG. 1;

FIG. 22 shows a characteristic of the band-pass filter having the configuration of FIG. 21;

FIG. 24 shows a characteristic of an example of an ideal band-pass filter;

FIG. 27 shows a configuration of a band-pass filter applicable to a configuration of FIG. 26;

FIG. 28 shows a characteristic of the band-pass filter having the configuration of FIG. 27;

FIG. 29 shows a configuration of another band-pass filter applicable to the configuration of FIG. 26;

FIG. 30 shows a characteristic of a band-pass filter having a configuration of FIG. 29;

FIGS. 33A, 33B, 33C, 34A, 34B, 35, 36A, 36B and 36C illustrate operation of an encoder in a configuration of FIG. 32;

DETAILED DESCRIPTION OF THE PREFERRED EMBODIMENTS

Hereafter, a multi-level image coding and decoding method and device according to the present invention will now be described.

First, a first embodiment of the present invention is a facsimile device. Specifically in the first embodiment, a feature quantity is extracted using wavelet transform on (2, 2).

Figure 1:
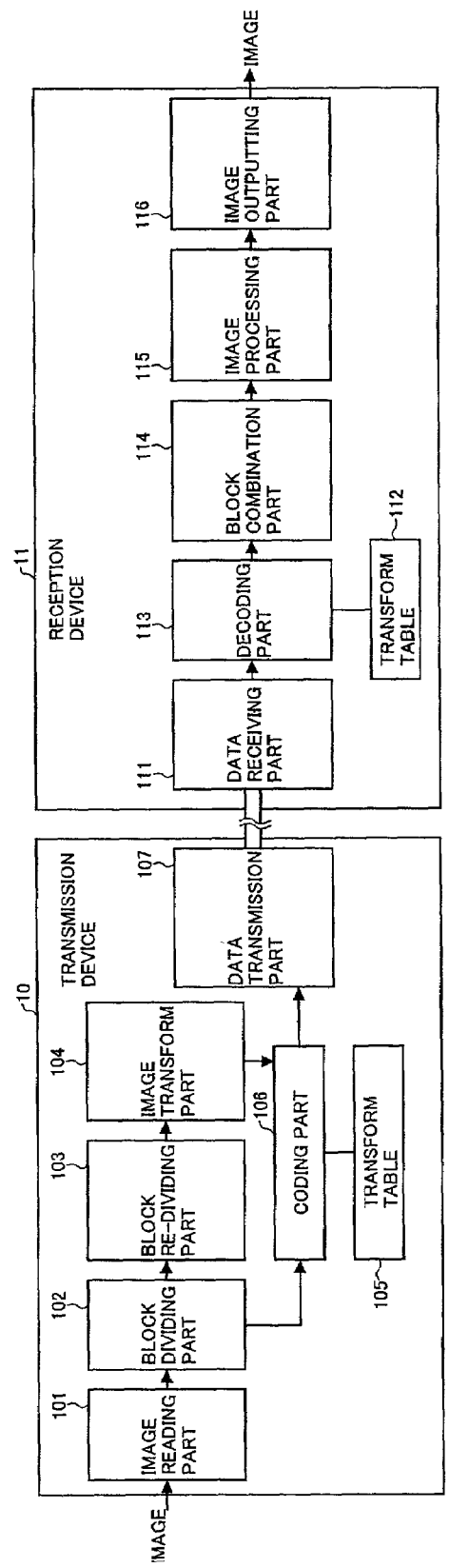
FIG. 1 is a block diagram of an image coding and decoding device in a first embodiment of the present invention.

FIG. 1 shows a functional block diagram showing a configuration of the facsimile system in the first embodiment of the present invention. The facsimile system shown in this figure includes a transmission device 10 which carries out a fixed-length coding on a monochrome multi-level gray scale image for every block, and transmits it, and a reception device 11 which decodes code data received from the transmission device 10 for every block, and outputs the thus-obtained image.

Specifically, the transmission device 10 includes an image reading part 101, a block dividing part 102, a block re-dividing part 103, an image transform part 104, a transform table 105, a coding part 106, and a data transmission part 107.

The image reading part 101 reads optically an original laid on an original table which is not shown by a CCD sensor, and outputs the read image data to the block dividing part 102. In this embodiment, this image reading part 101 reads a monochrome gray scale image of 256 pixels along each of the vertical and horizontal directions. Moreover, the pixel value of each pixel in this case is of 256 gray scale levels.

The block dividing part 102 divides, into the rectangle blocks in a predetermined size, the image read in the image reading part 101. Specifically, the size of each rectangular block corresponds to a unit size on coding operation to be performed subsequently, and, is of 4 pixels by 4 pixels.

The block re-dividing part 103 re-divides, further into blocks (referred to as "small blocks", hereinafter) corresponding to a unit size on the image transform part 104, each block output from the block dividing part 102. The size of each small block is of 2 pixels by 2 pixels.

The image transform part 104 performs frequency transform etc. on the image data in the small blocks output from the block re-dividing part 103. Wavelet transform for obtaining pixel value average and an edge on each small block is specifically performed there, and the feature quantity thereof is extracted.

The coding part 106 codes the pixel value of each block of 4×4 output from the block dividing part 102 using the transform table 105 into fixed-length data. The coding is such that, not the same number of bits are assigned for a pixel value on each pixel, but a larger number of bits are assigned for a pixel value on a pixel which is of an edge part so as to keep the edge during the coding while the fixed-length coding is achieved in terms of the entire block. Detailed description on the transform table 105 and the coding part 106 will be made later.

The data transmission part 107 transmits the fixed-length data output from the coding part 106 to the reception device. Although this transmission device 10 has a display part, an operation panel, etc. which are not shown, description thereof is omitted.

Thus, in the transmission device 10, the image data read in the image reading part 101 is divided into blocks, and the image data in each block is coded one by one to the fixed-length data. Thereby, a partial feature such as edge part which the original image has can be reflected by the code data, without causing degradation in coding efficiency, as a result of large number of bits are assigned to the edge part of the image data as mentioned above.

Next, a configuration of the reception device 11 shown in FIG. 1 will now be described. As shown in this figure, this reception device 11 has a data receiving part 111, a transform table 112, a decoding part 113, a block combination part 114, an image processing part 115, and an image outputting part 116.

The data receiving part 111 receives the fixed-length data transmitted from the transmission device 10 one by one through a communication circuit. The transform table 112 has the same contents as the transform table 105 in transmission device 10.

The decoding part 113 decodes the fixed-length data received by the data receiving part 111 using the transform table 112 into the pixel values corresponding to every block of 4×4. In this decoding part 113, after finishing decoding processing of image data using the transform table 112, a random number according to pseudo random sequence such as an M sequence is generated sequentially in case process of adding random noise is added is previously set, and the random number is inserted into the image data. This is because block distortion caused by gray scale difference in block boundary or same values on pixel values in block should be prevented, and, thus a high definition image is reproduced.

The block combination part 114 combines the image data of each block output from the decoding part 113 from fixed-length data, one by one, and, finally forms the entire image data. The image-processing part 115 performs various image processing to the image data thus-obtained. The image outputting part 116 outputs the image data having undergone the image processing carried out by the image-processing part 115, and, specifically, performs display of the image data on the display part which is not shown, printing of the image data onto a printing paper, etc.

In the reception device 11 which has the above-mentioned configuration, the code data obtained by the fixed-length coding may be restored efficiently, without losing partial features which the original image has.

Figure 2A:
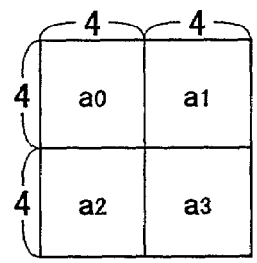
FIGS. 2A and 2B illustrate block dividing and re-dividing according to the first embodiment of the present invention.
Figure 2B:
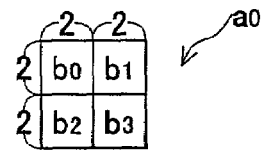

Next, the block dividing performed by the block dividing part 102 and the block re-dividing part 103 will now be described in detail. FIGS. 2A and 2B illustrate a concept of the block dividing on the block dividing part 102 and the block re-dividing part 103 shown in FIG. 1. The size of original image data is assumed as 8×8 pixels for the sake of simplification of description here.

As shown in FIG. 2A, the block dividing part 102 divides, into four blocks a0, a1, a2, and a3 each of a size of 4×4, the original image data of 8×8 read by the image reading part 101. This block size is determined so as to be in accordance with a unit size on the coding processing by the coding part 106. This block dividing part 102 has the same configuration as that widely used in various image-processing devices which perform such block coding operation.

The block re-dividing part 103 divides, further into four smaller blocks b0, b1, b2, and b3 each of a size of 2×2, each block output from the block dividing part 102, as shown in FIG. 2B. The reason for further dividing into such smaller blocks each of 2×2 is that, the block size is made in accordance with a unit size on the (2, 2) wavelet transform applied in the image transform part 104. The reason for performing this wavelet transform is for achieving such fixed-length coding as to keep edge information.

Figure 3:
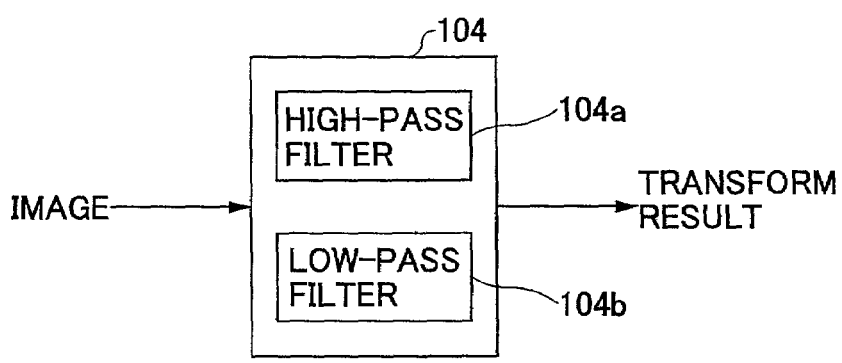
FIG. 3 is a block diagram showing a configuration of an image transform part in a configuration shown in FIG. 1.
Figure 4:
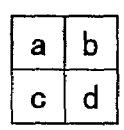
FIG. 4 illustrates operation of low-pass filter and high-pass filter in the configuration of FIG. 1.

Although re-dividing is made into blocks each of the size 2×2 from each block of the size of 4×4 in this embodiment, particular sizes of the blocks and small blocks are not limited thereto. For example, the original image data is first divided into n×m pixel blocks (where n and m are integers), each of which is re-divided into smaller blocks each of a size of n/p×m/r pixels (where p and r are integers). In this case, coding is made in a unit of n×m rectangular block, while image transform is made in a unit of n/p×m/r small block Next, the frequency transform processing performed in the image transform processing part 104 shown in FIG. 1 will now be described in detail. FIG. 3 and FIG. 4 illustrate the concept of the frequency transform processing performed in the image transform processing part 104 shown in FIG. 1.

As shown in FIG. 3, in the image transform processing part 104, a high-pass filter 104a and a low-pass filter 104b are applied on the image data in the above-mentioned small block. For example, in this high-pass filter, the difference between the maximum and minimum in pixel values in the small block is obtained in consideration of pixel arrangement direction. In the low-pass filter, for example, average of pixel values in the small block is calculated.

As technology of performing functions of high-pass filter 104a and low-pass filter 104b with one path, wavelet transform shown in FIG. 4 is known. As shown in this figure, when the pixel values of four pixels in the small block of 2×2 are assumed as being a, b, c, and d, respectively, the low-pass filter (L) performs the function of the following formula:

$$L=(a+b+c+d)/4$$

The high-pass filter performs the function (H1, H2 and H3) of the following formulas:

$$H1=(a+c)/2-(b+d)/2$$

$$H2=(a+b)/2-(c+d)/2$$

$$H3=(a-b)-(c-d)$$

Figures 5A, 5B, 5C:
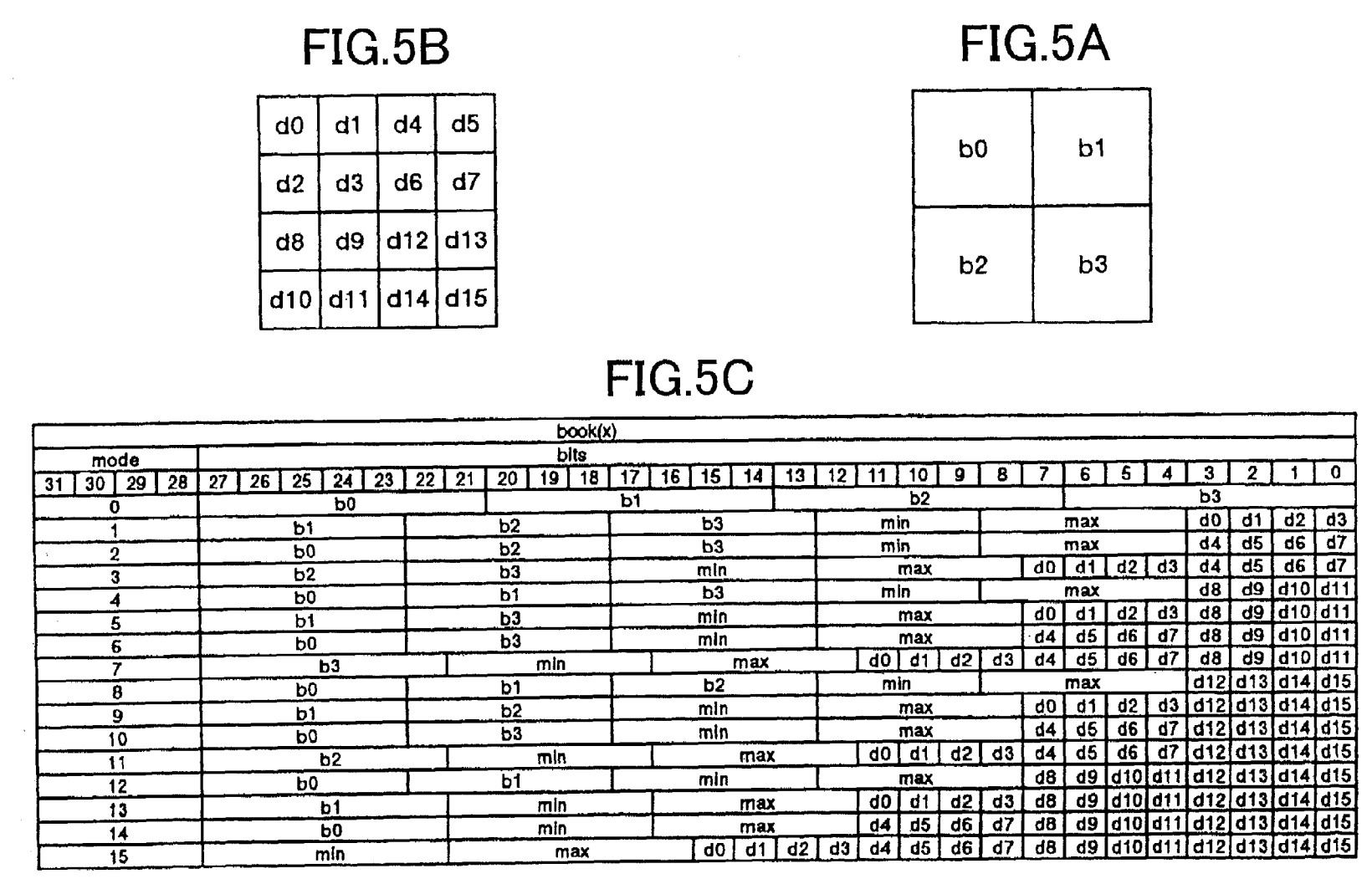

Next, the fixed-length coding processing which the coding part 106 shown in FIG. 1 performs will now be described in detail. FIGS. 5A, 5B and 5C illustrate an example of the transform table 105 shown in FIG. 1, and FIG. 6 illustrates modes 0 through 15 determined based on existence/absence of the edge in the above-mentioned small block.

First, as are shown in FIG. 5A, and the pixel values of the pixels in the block are assumed as being d0 through d15 and, as shown in FIG. 5B, four divided small blocks set referred to as b0, b1, b2, and b3, respectively.

Figure 6:
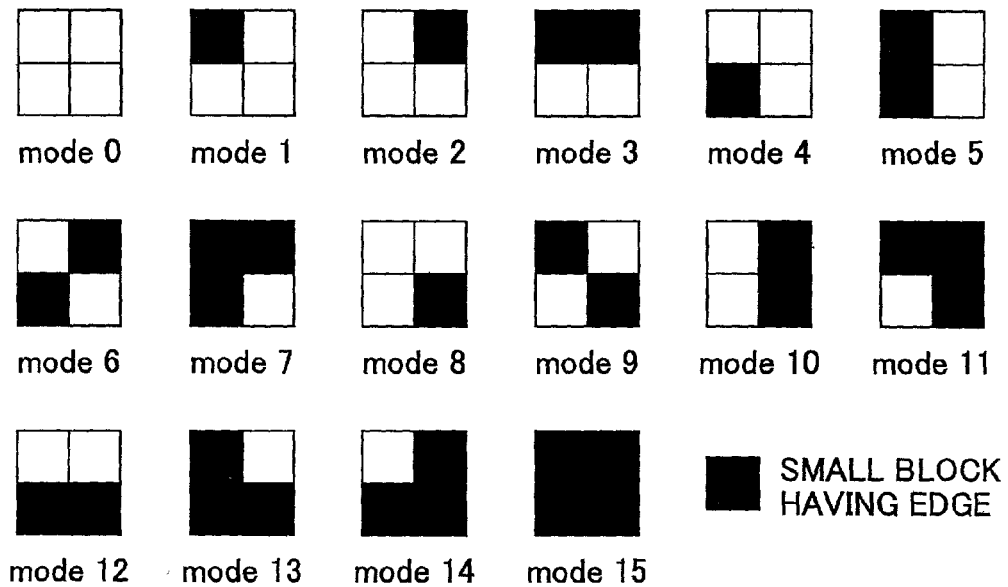
FIG. 6 illustrates operation of the coding part in the configuration of FIG. 1.

Next, when it is determined whether edge is included in four pixels of each of the above-mentioned small blocks, 16 types of patterns as shown in FIG. 6 are expected. That is, each block should correspond to any of these modes 0 through 15. Specifically, the mode 0 shows a case where edge exists in none of these small blocks, and the mode 1 shows a case where edge exists only in the upper left small block b0. Similarly, the mode 15 shows a case where edge exists in each of all the small blocks b0 through b3.

The transform table 105 specifies the number of bits assigned to each small block of the relevant block according to every above-mentioned modes as shown in FIG. 5C. Accordingly, it is possible to apply coding scheme different according to the respective modes. In other words, it becomes possible to perform fixed-length coding while edge information is kept by controlling the coding scheme according to the relevant mode as to existence/absence of edge.

Specifically, in the case of the above-mentioned mode 0, 7 bits are assigned to each of all the small blocks b0, b1, b2, and b3. Furthermore, since 4 bits are required as a mode bit which shows identification of the mode concerned, a total of 32 bits are assigned for every small block.

Consequently, the average (henceforth "pixel average" or "average density") of the pixel values of each small block obtained through the application of the low-pass filter 104*b* should be expressed by 7 bits for every small block. When the pixel average is originally expressed by 8 bits or more, only the most significant 7 bits thereof are used, and the other bit is discarded. The reason why 7-bit pixel average is applied in the case of mode 0 is that, as shown in FIG. 6, in this mode, there is no small block having edge.

Next, in the case of the mode 1, 5 bits are assigned to the small blocks b1, b2, and b3 in each of which edge does not exist, while 13 bits are assigned to the small block b0 in which edge exists. Thereby, the sum total with the above-mentioned mode bits becomes 32 bits.

There, each pixel which of the small block b0 in which edge exists will now be discussed. In this case, 4 bits are assigned to the pixel value (minimum) on the pixel not forming the edge while 5 bits are assigned to the pixel value (maximum) on the pixel forming the edge. Further, 4 bits are assigned to position information indicating whether or not each pixel forms the edge in the small block b0. Then, the total is 13 bits mentioned above.

Thus, in the case of the mode 1, 5 bits are assigned to the pixel which forms the edge, while, 4 bits are assigned to the pixels (in the case of the small block b0) and 5 bits are assigned to the pixels (small blocks b1, b2, and b3) which do not form the edge. Since each pixel is expressed by 2 bits regardless of whether or not forming edge when carrying out the fixed-length coding of the 16 pixels in 1 block by 32 bits according to the related art, the resolution can be sharply improved by the coding in this embodiment according to the present invention.

Similarly, in the case of the mode 15, 6 bits are assigned to the pixel value (minimum) of the pixel not forming the edge, 6 bits are assigned to the pixel value (maximum) of the pixel forming the edge, and 16 bits are assigned to the position information on edge which shows whether or not each pixel in respective small blocks b0, b1, b2 and b3 forms the edge. Thereby, the sum total with the mode bit also becomes 32 bits. In addition, in this mode 15, since each of all the small blocks includes the pixel forming the edge, pixel average is not taken.

Thus, in the coding part 106, actually applied coding scheme is controlled according to the above-mentioned transform table 105 and thus according to whether the pixel which forms the edge exists in each small block. Consequently, the fixed-length coding which keeps edge information can be achieved. In addition, the transform table 112 which the reception device 11 has is the same as this transform table 105, and corresponding decoding processing is performed by the decoding processing part 113 using this transform table 112.

Figure 7:
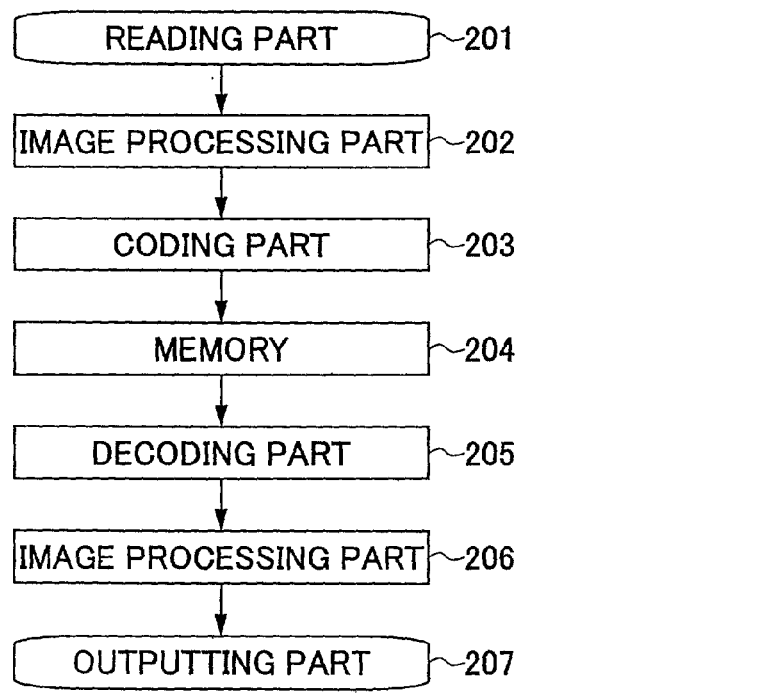
FIG. 7 is a block diagram showing a configuration of a coding and decoding device in a second embodiment of the present invention.

Next, a second embodiment of the present invention will now be described. FIG. 7 is a block diagram showing an image processing device in the second embodiment of the present invention. In this device, a reading part 201 reads an original optically and condenses the reflected light of lamp irradiation to the original onto a photoelectric device with mirrors and lens. The image signal thus converted into an electric signal is output as a digital signal. Shading correction, scanner gamma correction, etc. are then performed thereon by an image processing part 202. In a coding part 203, fixed-length coding is performed on the thus-obtained multi-level image data. By applying the fixed-length coding scheme, this image processing device may be applied to a copying machine, for example, as described above. That is, in a copying machine, it is required to rotate an image in a state where it is coded, for example.

In addition, an image storage part which is not shown stores this code data. In this embodiment, the data having undergone fixed-length coding (compression) in the coding part 203 is stored there. The coded data is then written in a semiconductor memory which consists of DRAM. Rotation of image etc. can be performed on this memory 204.

Next, the stored code data is then sent to a decoding part 205, and is decoded into image data by this decoding part 5. The thus-decoded image data is then sent to an image-processing part 206 from the decoding part 5. In this image-processing part 206, spatial filter processing, gamma transform processing, and gray scale processing are performed. The data having undergone the image processing is then sent to an outputting part 207 from the image-processing part 206. In addition, the outputting part 207 includes an electro-photographic outputting unit which includes an optical writing system employing an LD (laser diode) etc.

Figure 8:
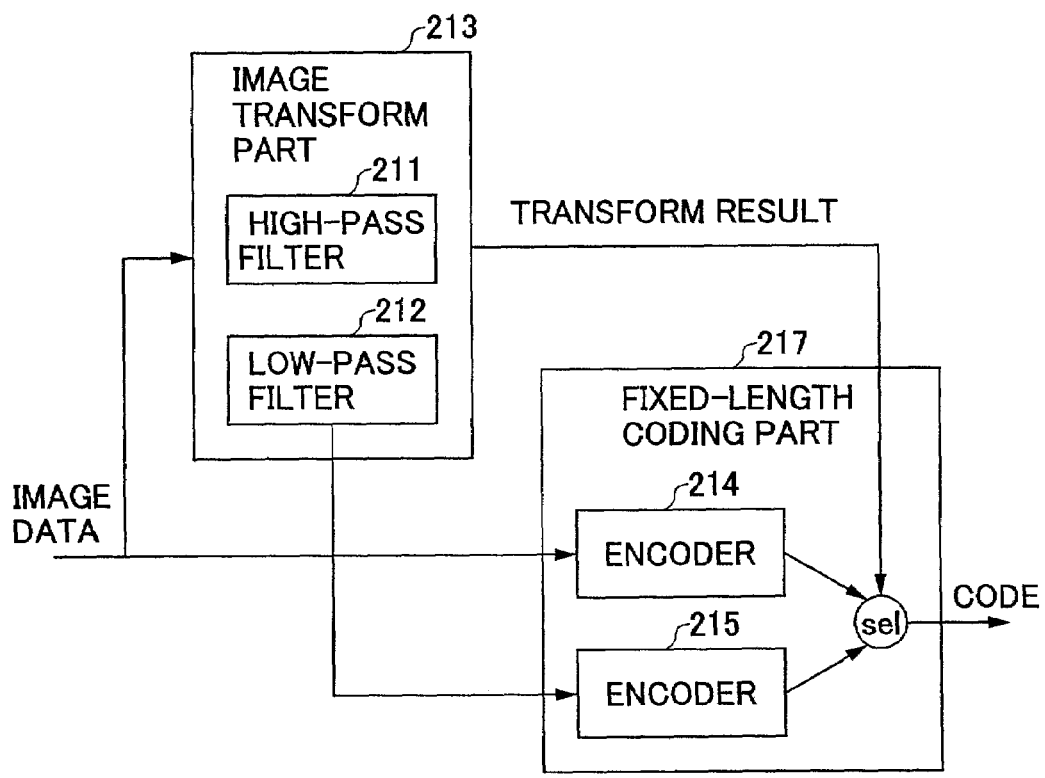
FIG. 8 is a block diagram showing a configuration of an image transform part and a fixed-length coding part in a configuration of FIG. 7.

Hereafter, with reference to FIG. 8, details of the above-mentioned coding part 203 will be described. Since a configuration thereof is similar to that of the above-described first embodiment of the present invention, duplicated description is omitted. That is, as shown in FIG. 8, an input image data is input into an image transform part 213 which includes a high-pass filter 211 and a low-pass filter 212. Moreover, an encoder 214 and an encoder 215 are selectively applied according to the output of the high-pass filter 211 and the output of the low-pass filter 212.

The encoder 214 is especially used for edge images formed of characters/letters etc. while the encoder 215 is especially used for picture image parts formed of halftone dots, and it is preferable to code, by the coding part 215, a picture having continuous gray scale. Moreover, since an image block having a large output of the high-pass filter 211 is a block containing many edges, such as characters, coding is performed by the encoder 214 for preserving the edges. Since an image block having a large output of the low-pass filter 212 is a gray scale image which includes smooth halftone dots or a continuous gray scale, the encoder 215 performing faithful preservation of halftone dots should be used therefor.

As the encoders 214 and 215 may have configurations performing the above-described performances according to the prior art, and description of the details thereof is thus omitted. The output of the low-pass filter 212 is input into the encoder 215, while the output of this low-pass filter 212 is sampled, and thereby, code data is generated, by the encoder 215.

Figure 9:
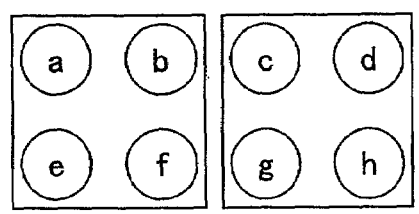
FIG. 9 illustrates coding operation in an encoder shown in FIG. 8.

As specifically shown in FIG. 9, average of the pixel values of a, b, e, and f of the relevant image block is taken, and the average result is used as code data. On the next block, average of the pixel values of c, d, g, and h is taken, and the average result is used as code data. The amount of data becomes ¼ as a result of the above-described average operation being repeated. Assuming that the resolution of the present scanner is 600 dpi, the data sampled by sub-sampling operation thus becomes data of 300 dpi, i.e., ¼ in data amount of the read data, and, has a Nyquist frequency of 150 dpi. As a result, the component 150 dpi can be expressed therefrom Although halftone dots in a general printed matter are of around 150 dpi, since halftone dots exceeding this resolution is removed by the above-mentioned low-pass filter, turn Moiré (or aliasing) does not occur. By this, when halftone dots in spatial frequency lower than the resolution 150 dpi exists, these halftone dots themselves can be reproduced by this embodiment.

Figure 10:
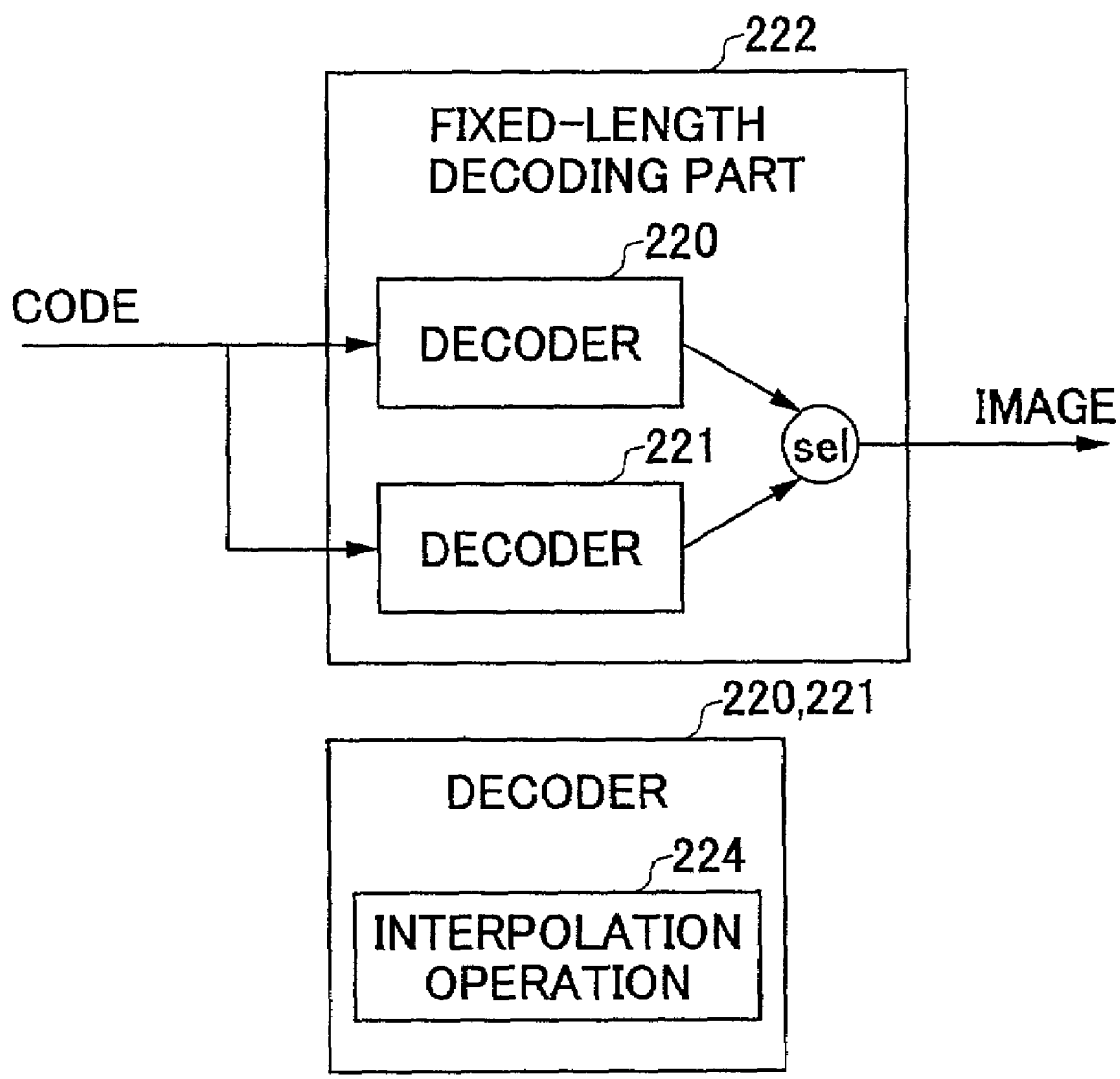
FIG. 10 is a block diagram showing a configuration of decoding part in the configuration of FIG. 7.

FIG. 10 shows a configuration of a fixed-length decoding part 222. As shown in FIG. 10, a decoder 220 performs decoding of-edge portions processed by the coding part 214 (see FIG. 8). Another decoder 221 perform decoding of non-edge portions processed by the coding part 215 (FIG. 8). Each of the decoders 220 and 221 includes an interpolation part 224.

Figure 11:
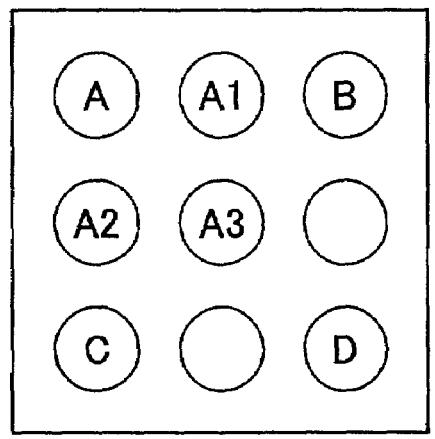
FIG. 11 illustrates decoding operation of a decoder shown in FIG. 10.

Next, operation of decoder 221 will now be described. A case is assumed where the decoder 211 decodes coded pixels A, B, C, and D shown in FIG. 11, for example, and, thus, pixels A1, A2, and A3 are generated as decoded data. In the second embodiment, interpolation operation (interpolation operation part 224) is performed according to a linear interpolation method. The coded pixel values A and B correspond to, for example, the average value of the pixel values a, b, e, and f, and the average value of c, d, g, and h of the original image shown in FIG. 9, respectively.

The following formulas (1), (2), and (3) illustrate a specific example of the linear interpolation operation, and, as shown there, the pixels A1, A2, and A3 can be obtained through simple weighting average. Then, by performing similar interpolation operation on all the coded pixels, the number of decoded pixels four times that of the coded pixels are obtained together with the original coded pixels. Thus, decoding is achieved. Simile operation style is the feature of this scheme. For an image part having not so high spatial frequency of halftone dots, practically sufficient quality of image can be obtained thereby.

$$A1 = (A+B)/2 \quad (1)$$

$$A2 = (A+C)/2 \quad (2)$$

$$A3 = (A+B+C+D)/4 \quad (3)$$

Figure 12:
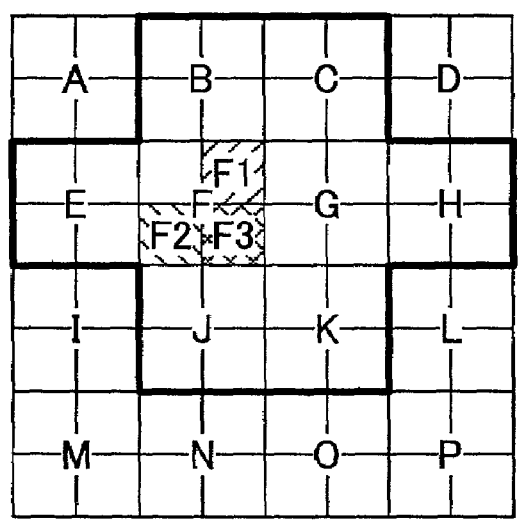
FIGS. 12 and 13 illustrate decoding operation on coded data in a third embodiment of the present invention.

Next, a third embodiment of the present invention will now be described. FIG. 12 illustrates operation of the third embodiment. In this embodiment, different from the above-described second embodiment, the decoder 221 (FIG. 10) combines coded pixels A through F shown in FIG. 12, for example, so as to generate decoded pixels F1, F2, and F3. In this third embodiment, a cubic-function convolution interpolation method is applied. That is, coefficients shown in FIG. 13 are applied as interpolation coefficients.

Figure 13:
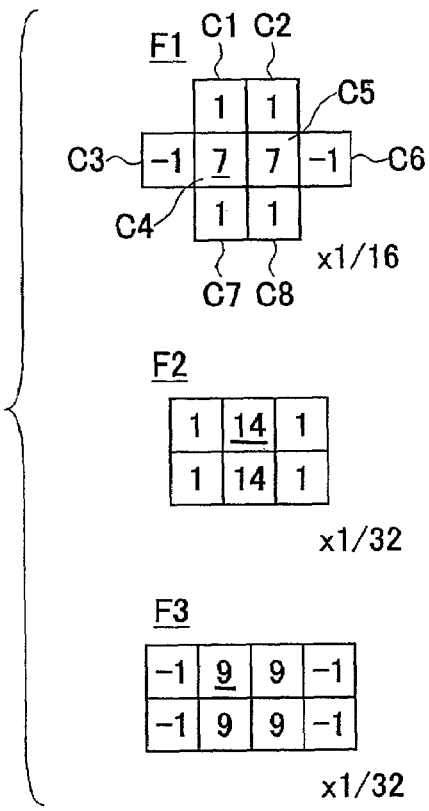

Specifically, when generating F1 pixel, the coefficients for F1 in FIG. 13 is applied. In this case, the portion currently underlined in the coefficients concerned is made to correspond to the coded pixel F in FIG. 12. That is, in the example of FIG. 12, interpolation operation is performed on eight coded pixels B, C, E, F, G, H, J and K enclosed by a thick line in FIG. 12 with the application of the template of the coefficients of FIG. 13 for F1. That is, as shown in the following formulas (4), the corresponding coded pixels B, C, E, F, G, H, J and K and interpolation coefficients c1, c2, c3, c4, c5, c6, c7, and c8 are multiplied, respectively, and are totaled, and then, the sum total value is divided by 16 which is the sum total of the interpolation coefficients.

$$F1 = \{B \cdot c1 + c \cdot c2 + E \cdot c3 + F \cdot c4 + G \cdot c5 + H \cdot c6 + J \cdot c7 + \quad (4)$$
$$K \cdot c8\} / (c1 + c2 + c3 + c4 + c5 + c6 + c7 + c8)$$
$$= \{B \cdot 1 + C \cdot 1 + E \cdot (-1) + F \cdot 7 + G \cdot 7 + H \cdot (-1) + J \cdot c7 +$$
$$K \cdot 1\} / 16$$

In the cases of F2 and F3, the interpolation operation as shown in the following formulas (5) and (6) are performed similarly:

$$F2 = \{E \cdot 1 + F \cdot 14 + G \cdot 1 + I \cdot 1 + J \cdot 14 + K \cdot 1\}/32 \quad (5)$$

$$F3 = \{E \cdot (-1) + F \cdot 9 + G \cdot 9 + H \cdot (-1) + I \cdot (-1) + J \cdot 9 + \quad (6)$$
$$K \cdot 9 + L \cdot (-1)\}/32$$

Then, halftone dots of the original image can be reproduced quite correctly from the data of coded pixels by performing the interpolation operation by the interpolation coefficients. Thus, according to the third embodiment, in comparison to the above-described second embodiment, it is possible to reproduce halftone dots in higher spatial frequency. Accordingly, it becomes possible to control occurrence of Moiré caused by reproduction error of halftone dots, and, thus, high definition image quality can be obtained.

Moreover, with reference to FIG. 12, description will now be made on a fourth embodiment of the present invention. The decoder 221 (see FIG. 10) decodes the coded pixels A through F of FIG. 12, and, thus, generates the decoded pixels F1, F2, and F3, for example by interpolation operation. In this embodiment, interpolation operation is performed using smoothing interpolation coefficients shown in FIG. 14, for example, different from the above-described third embodiment.

Figure 14:
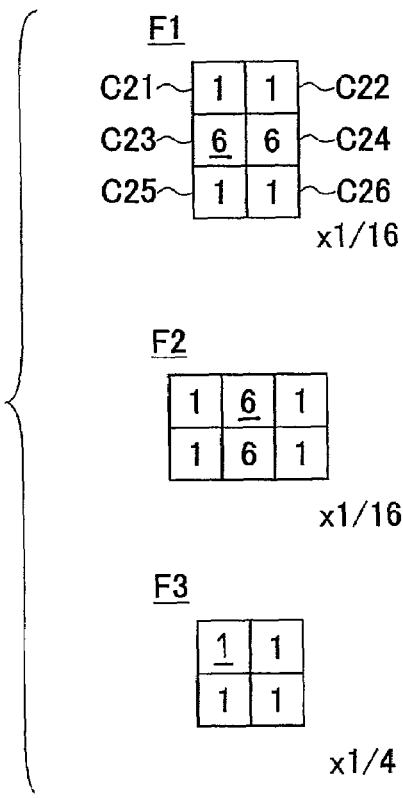
FIG. 14 illustrates decoding operation on coded data in a fourth embodiment of the present invention.

In this case, as in the above-described third embodiment, among the interpolation coefficient template of FIG. 14, the coefficient portion in which the number is underlined is made to correspond to the coded pixel F, and the template is applied accordingly. For example, when calculating F1 by the interpolation operation with the application of the interpolation coefficient template of FIG. 14 (F1), the interpolation operation is specifically performed on six coded pixels B, C, F, G, J and K as in the case of the third embodiment. That is, as shown in the following formula (7), the corresponding coded pixels B, C, F, G, J and K and the interpolation coefficients c21, c22, c23, c24, c25, and c26 are multiplied, respectively, and are totaled, and the sum total value is divided by 16 which is the sum total of the interpolation coefficients.

$$F1 = \{B \cdot c21 + c \cdot c22 + F \cdot c23 + G \cdot c24 + J \cdot c25 + K \cdot c26\}/ \quad (7)$$
$$(c21 + c22 + c23 + c24 + c25 + c26)$$
$$= \{B \cdot 1 + C \cdot 1 + F \cdot 6 + G \cdot 6 + J \cdot 1 + K \cdot 1\}/16$$

As to F2 and F3, the interpolation operation is performed similarly, and, thus, these decoded pixels are obtained.

In the case of this fourth embodiment, as shown in FIG. 14, as compared with the case of the coefficients shown in FIG. 13 applied to the third embodiment, the differences in numerical value between respective each coefficients are small. Consequently, in case of applying the interpolation operation according to the fourth embodiment, substantially performing average operation together with peripheral pixels, and, thus, smoothing effect is provided. For this reason, in the fourth embodiment, since halftone dots are reproducible with controlling occurrence of Moiré, even in a case where Moiré occurs due to the interpolation coefficients according to the third embodiment. Accordingly, a high definition reproduction of image can be achieved.

Next, a fifth embodiment of the present invention will now be described. In the fifth embodiment, when a picture regarding image processing mode is set, regardless of the state of how the relevant image data has passed through the high-pass filter 211 and low-pass filter 212 shown in FIG. 8, i.e., whether or not the relevant pixels form edge, processing prepared for non-edge pixel is applied across the board. That is, in this embodiment, paying attention to a general fact that so high resolution is not required in case of the picture regarding image processing mode, when the relevant image includes edge parts and non-edge parts in a mixed state, coding by smoothing operation and down-sampling operation, and decoding by interpolation are performed throughout the image. Consequently, image degradation caused by switching in processing prepared for edge part and that prepared for non-edge part can be prevented.

According to the above-described second through fourth embodiments, the image transform part 213 (FIG. 8) performs coding while switching coding scheme at any time according to the current state of given image data. However, in such a system, for a halftone-dot image having a specific spatial frequency, regions to be processed by the encoder 214 and regions to be processed by the encoder 215 occur alternately, and, thereby, Moiré occur. In order to avoid such a situation, such a switching operation should not be performed for a character/photograph mode or a photograph mode for which so high resolution is not actually required. Therefore, according to the fifth embodiment, when a user chooses the above-mentioned picture regarding image processing mode from an operation panel (not shown), coding using the encoder 215 prepared especially for picture images is applied. Thereby, a smooth image without Moiré can be provided as a result of such an operation mode is prepared. Thus, in this embodiment, processing prepared for non-edge part is performed throughout an image in case the image includes edge parts and non-edge parts in a mixed state, so that as switching in processing is thus not performed, a smooth image can be obtained.

Figure 15:
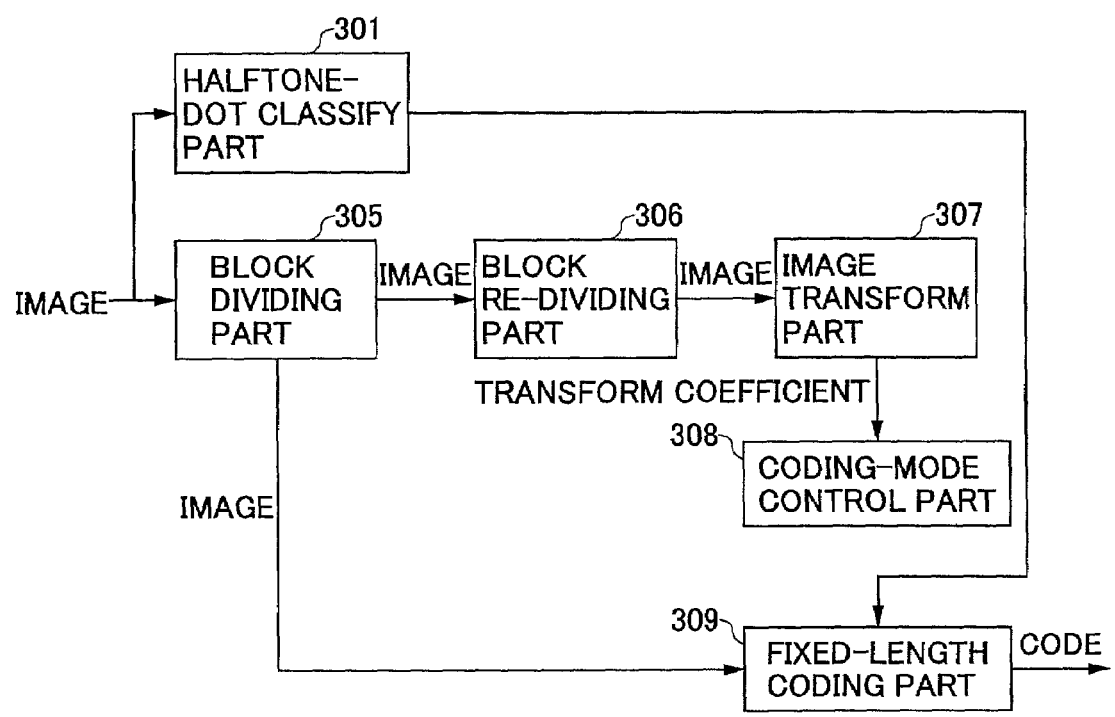
FIG. 15 is a block diagram showing a configuration of a coding device in a sixth embodiment of the present invention.

Next, a sixth embodiment of the present invention will now be described with reference to a block diagram of FIG. 15. As shown in the figure, a coding device in this embodiment includes a halftone-dot classify part 301 classifying halftone-dot region from an image including halftone-dot image and line drawing in a mixed state; a block dividing part 305 dividing a given image into rectangular blocks each having a predetermined fixed size; a block re-dividing part 306 dividing each of the rectangular blocks again so as to cause the size of the thus-obtained block to match a processing unit on a image transform part 307; the image transform part 307 performs transform operation such as frequency transform on the image in the divided state output by the block re-dividing part 306; a coding-mode control part 308 determining whether or not edge component exists in transform coefficient obtained from the image transform part 307; and a fixed-length coding part 309 outputting code words having a predetermined fixed code length for the original image in the block-divided state based on the result of coding-mode control part 308.

The above-mentioned block dividing part 305, block re-dividing part 306, image transform part 307, coding-mode control part 308 and fixed-length coding part 309 may have configurations the same as those disclosed in Japanese laid-open patent application No. 12-274381, and detailed description thereof is omitted. Moreover, the halftone-dot classifying part 301 operates in accordance with the halftone-dot classifying method disclosed by Japanese patent No. 2777379, for example. However, as long as it is a method for classifying halftone-dot region from an image in which halftone-dot image and line drawing are mixed, any other method may be applied for the same purpose.

In the above-described embodiments, determination is made as to whether or not edge components are included from a result of image transform operation performed by the image transform part 213, and, according to the determination result, coding is performed. However, according to the sixth embodiment, as shown in Table 1 below, coding is performed according to a result of halftone-dot classification.

TABLE 1

| HALFTONE-DOT CLASSIFICATION RESULT | APPLIED CODING SCHEME |
|---|---|
| HALFTONE DOT | AVERAGE DENSITY (GRAY SCALE) |
| NOT HALFTONE DOT | MAX-AND-MIN AVERAGE APPROXIMATION |

Thus, according to the sixth embodiment, when it is determined as halftone-dot region as shown in "Table 1", simple average density (or average gray scale) in each block is output as relevant code as it is. When it is determined as non-halftone-dot region, the maximum-and-minimum average approximating method is applied for the coding. As to the maximum-and-minimum average approximating method, since it is the same as that disclosed by Japanese laid-open patent application No. 12-27438 mentioned above, or will be described later for another embodiment of the present invention, no detailed description is made here.

As mentioned above, in the sixth embodiment, coding is performed based on a halftone-dot classification result, and this determination is made for relatively wide region of a given image. Consequently, since switching between the coding processing for edge parts and the coding processing for non-edge parts does not occur in a halftone-dot image, Moiré caused by periodic difference between cycle of halftone dot and cycle of the rectangle blocks on the block dividing part does not occur.

Figure 16:
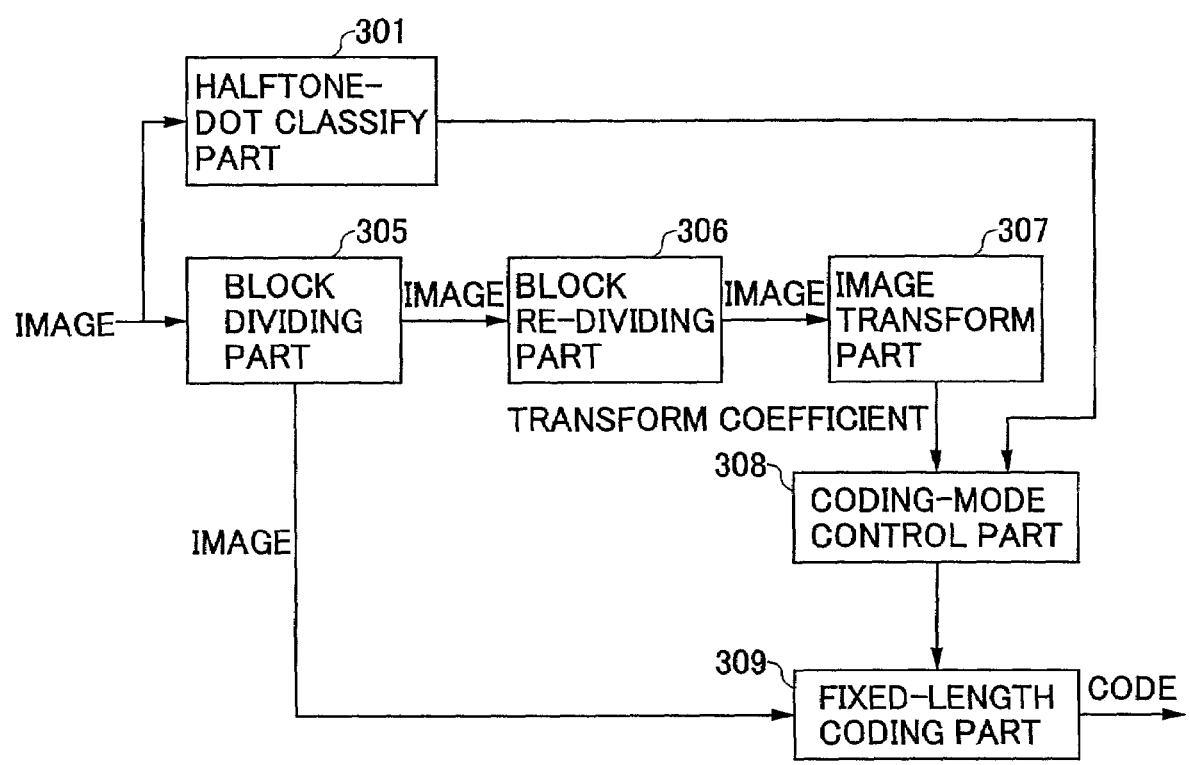
FIG. 16 is a block diagram showing a configuration of a coding device in a seventh embodiment of the present invention.

Below, a coding device in a seventh embodiment of the present invention will now be described with reference to FIG. 16. The coding device in this embodiment includes a halftone-dot classify part 301 classifying halftone-dot region from an image including halftone-dot image and line drawing in a mixed state; a block dividing part 305 dividing a given image into rectangular blocks each having a predetermined fixed size; a block re-dividing part 306 dividing each of the rectangular blocks again so as to cause the size of the thus-obtained block to match a processing unit on a image transform part 307; the image transform part 307 performs transform operation such as frequency transform on the image in the divided state output by the block re-dividing part 306; a coding-mode control part 308 determining whether or not edge component exists in transform coefficient obtained from the image transform part 307; and a fixed-length coding part 309 outputting code words having a predetermined fixed code length for the original image in the block-divided state based on the result of coding-mode control part 308.

The above-mentioned block dividing part 305, block re-dividing part 306, image transform part 307, coding-mode control part 308 and fixed-length coding part 309 may have configurations the same as those disclosed in Japanese laid-open patent application No. 12-274381, and detailed description thereof is omitted. Moreover, the halftone-dot classifying part 301 operates in accordance with the halftone-dot classifying method disclosed by Japanese patent No. 2777379, for example. However, as long as it is a method for classifying halftone-dot region from an image in which halftone-dot image and line drawing are mixed, any other method may be applied for the same purpose.

In this seventh embodiment, a threshold used in order to determine edge/non-edge in the coding-mode control part 308 is controlled according to a result of the halftone-dot classification made by the halftone-dot classification part 301, and then, it is determined by using the threshold as to whether or not the relevant image block includes edge. Then, according to the following "Table 2", coding is performed by the relevant scheme.

TABLE 2

| HALFTONE-DOT CLASSIFICATION RESULT | PROCESSING IN CODING MODE CONTROL PART | CODING SCHEME TO BE APPLIED |
|---|---|---|
| HALFTONE DOT | IF H1 > TH1 OR H2 > TH1 OR H3 > TH1, EDGE OTHERWISE, NO-EDGE | MAX-AND-MIN AVERAGE APPROXIMATION AVERAGE DENSITY |
| NOT HALFTONE DOT | IF H1 > TH2 OR H2 > TH2 OR H3 > TH2, EDGE OTHERWISE, NO-EDGE | MAX-AND-MIN AVERAGE APPROXIMATION AVERAGE DENSITY |

Thus, as shown in Table 2, for image determined as halftone dots, the threshold is lifted (TH1) so that it is likely to be determined as "non-edge". On the other hand, for image determined as not halftone dots, the threshold is lowered (TH2<TH1) so that it is likely to be determined as "edge". Then, by using the threshold thus determined according to the result of halftone-dot classification, determination as to whether edge or non-edge is made by the coding-mode control part 308.

Figure 17:
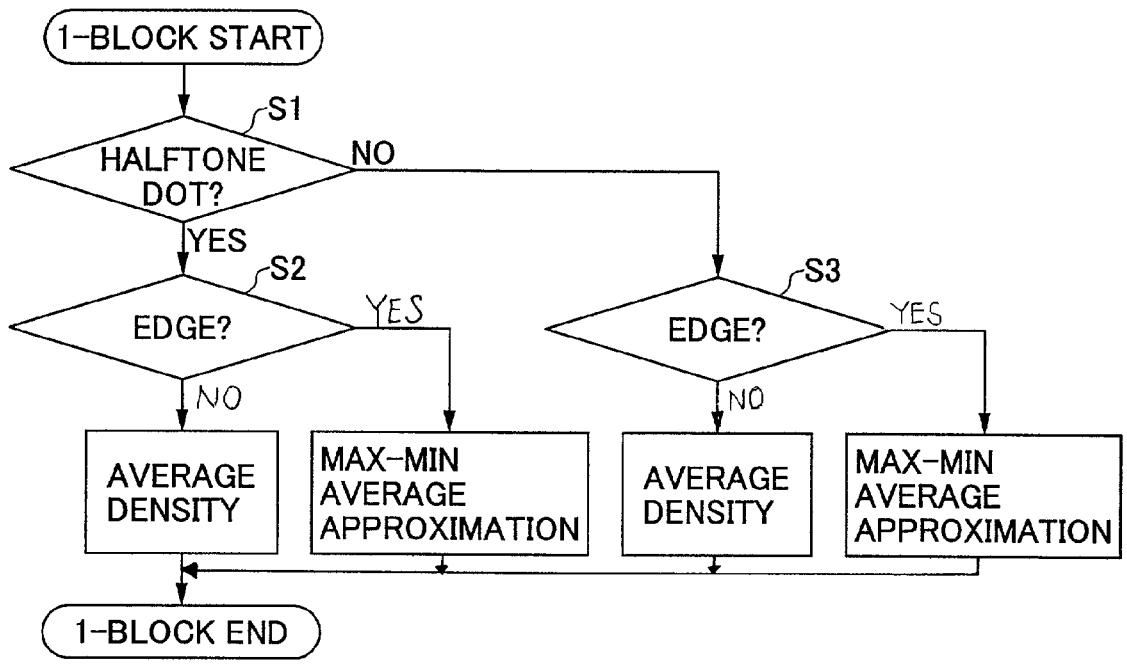
FIG. 17 is a flow chart of operation of the coding device in the seventh embodiment of the present invention.

A flow chart which shows operation of the coding device in the above-described seventh embodiment will be described with reference to FIG. 17. As shown in the figure, for a block determined as halftone dots by the halftone-dot classify part 301 in a step S1, the coding-mode control part 308 determines whether it is an edge component or a non-edge component in a step S2. That is, when the absolute value (H1, H2, H3, see FIG. 4) of the output of high-pass filter of the image transform part 307 exceeds the threshold, the block concerned is determined as edge and coding is made by the maximum-and-minimum average approximating method. Otherwise, it is determined as non-edge and coding is made with simple average density (or average gray scale, or average pixel value).

For a block determined as not halftone dots by the halftone-dot classify part 301 in a step S1, the coding-mode control part 308 determines whether it is an edge component or a non-edge component in a step S3. That is, when the absolute value of the output of high-pass filter of the image transform part 307 exceeds the threshold lower than that in the step S3, the block concerned is determined as edge and coding is made by the maximum-and-minimum average approximating method. Otherwise, it is determined as non-edge and coding is made with average density.

Thus, according to the seventh embodiment, coding mode determination threshold is controlled according to the result of halftone-dot classification. Then, it is determined whether edge component exists using this coding-mode determined threshold controlled, and coding is performed according to the determination. Thus, since it is determined further as to edge/non-edge using the result of halftone-dot classification even in a case where proper coding may not be applied only by using the result of halftone-dot classification independently, the coding processing by the so-called image-region classification form with more high accuracy can be attained.

Figure 18:
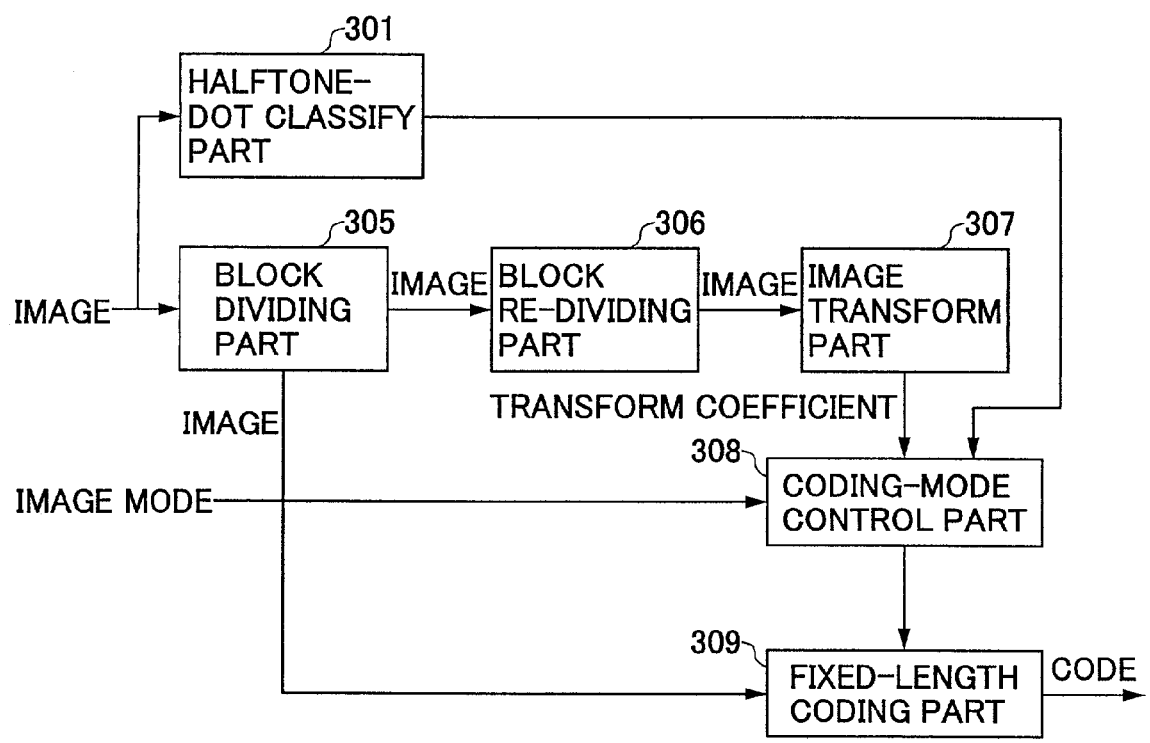
FIG. 18 is a block diagram showing a configuration of a coding device in an eighth embodiment of the present invention.

Below, a coding device in an eighth embodiment of the present invention will now be described with reference to a block diagram of FIG. 18. As shown in the figure, the coding device in this embodiment includes a halftone-dot classify part 301 classifying halftone-dot region from an image including halftone-dot image and line drawing in a mixed state; a block dividing part 305 dividing a given image into rectangular blocks each having a predetermined fixed size; a block re-dividing part 306 dividing each of the rectangular blocks again so as to cause the size of the thus-obtained block to match a processing unit on a image transform part 307; the image transform part 307 performs transform operation such as frequency transform on the image in the divided state output by the block re-dividing part 306; a coding-mode control part 308 determining whether or not edge component exists in transform coefficient obtained from the image transform part 307; and a fixed-length coding part 309 outputting code words having a predetermined fixed code length for the original image in the block-divided state based on the result of coding-mode control part 308.

The above-mentioned block dividing part 305, block re-dividing part 306, image transform part 307, coding-mode control part 308 and fixed-length coding part 309 may have configurations the same as those disclosed in Japanese laid-open patent application No. 12-274381, and detailed description thereof is omitted. Moreover, the halftone-dot classifying part 301 operates in accordance with the halftone-dot classifying method disclosed by Japanese patent No. 2777379, for example. However, as long as it is a method for classifying halftone-dot region from an image in which halftone-dot image and line drawing are mixed, any other method may be applied for the same purpose.

In the eighth embodiment, as shown in the following "Table 3", the coding mode determination threshold as to whether edge component is included in the relevant image block made by the coding-mode control part 308 is controlled according to an image processing mode selected by an operator from an operation part. As shown in Table 3, when an operator chooses an image processing mode from the operation part, the coding-mode determination threshold suitable for the thus-selected mode is chosen accordingly.

TABLE 3

| MODE SELECTED BY USER | HALFTONE CLASSIFY RESULT | PROCESSING OF CODING MODE CONTROL PART | APPLIED CODING SCHEME |
|---|---|---|---|
| CHARACTER | HALFTONE | IF H1 > 64 OR H2 > 64 OR H3 > 64, EDGE OTHERWISE, NON-EDGE | MAX-AND-MIN AVERAGE APPROXIMATION SIMPLE AVERAGE |
| | NOT HALFTONE | IF H1 > 32 OR H2 > 32 OR H3 > 32, EDGE OTHERWISE, NON-EDGE | MAX-AND-MIN AVERAGE APPROXIMATION SIMPLE AVERAGE |
| CHARACTER/ PHOTOGRAPH | HALFTONE | IF H1 > 96 OR H2 > 96 OR H3 > 96, EDGE OTHERWISE, NON-EDGE | MAX-AND-MIN AVERAGE APPROXIMATION SIMPLE AVERAGE |
| | NOT HALFTONE | IF H1 > 48 OR H2 > 48 OR H3 > 48, EDGE OTHERWISE, NON-EDGE | MAX-AND-MIN AVERAGE APPROXIMATION SIMPLE AVERAGE |
| PHOTOGRAPH | HALFTONE | IF H1 > 128 OR H2 > 128 OR H3 > 128, EDGE OTHERWISE, NON-EDGE | MAX-AND-MIN AVERAGE APPROXIMATION SIMPLE AVERAGE |
| | NOT HALFTONE | IF H1 > 64 OR H2 > 64 OR H3 > 64, EDGE OTHERWISE, NON-EDGE | MAX-AND-MIN AVERAGE APPROXIMATION SIMPLE AVERAGE |

For example, when an operator chooses a character (letter) mode by the operation part, if the image region concerned is determined by the halftone-dot classification part 201 as being of halftone dots, the coding-mode determination threshold is set to 64, while it is set to 32 if determined as being not of halftone dots. On the other hand, when the operator chooses a character/photograph mode by the operation part, if the image region concerned is determined by halftone-dot classification as being of halftone dots, the coding-mode determination threshold is to 96, while it is set to 48 if determined as being not of non-halftone dots. Further, when the operator chooses a photograph mode by the operation part, if the image region concerned is determined by halftone-dot classification as being of halftone dots, the coding-mode determination threshold is set to 128, while it is set to 64 if determined as being of non-halftone dots.

The case where the operator chooses "character mode" in the operation part will now be discussed. It can be expected that edge information such as characters exists in an image mostly in the case of character mode, while a photograph image such as a halftone-dot image seldom exists. Therefore, in this case, even determination as being "of halftone dots" is made by the halftone-dot classification, determination as being "edge" is prevented from being likely to be made as a result of lowering of the coding-mode determination threshold.

On the other hand, in the case where an operator chooses "photograph mode" from the operation part conversely, it can be expected that edge information such as characters seldom exists in the relevant image. Therefore, in this case, even determination as being "not of halftone dots" is made by the halftone-dot classification, determination as being "edge" is caused to be likely to be made as a result of lifting the coding-mode determination threshold.

Thus, the coding-mode determination threshold suitable to the image processing mode selected by the operator is selected, and, as a result, it is possible to achieve coding processing according to image region classification form having high accuracy and high applicability.

Next, a ninth embodiment of the present invention will now be described. In the above-described embodiments, when processing an image in which edge parts and non-edge parts are mixed, in order to avoid image degradation on the applied block boundary lines, before coding (compression), halftone-dot classification is applied, and, the coding scheme applied is controlled according to the result of halftone-dot classification. According to the ninth embodiment, while halftone-dot classification is applied and the coding scheme is controlled according to the result of halftone-dot classification, further coding (compression) of non-edge parts employs frequency-band control by a band-pass filter, and, after that, down-sampling. Further, decoding on the non-edge parts employs the frequency-band control by a band-pass filter and, after that, interpolation such as cubic-function convolution or other interpolation having smoothing effect. Consequently, improvement in good halftone-dot reproducibility and resolution can be realized, without occurrence of Moiré by the periodic difference between the cycles of halftone dots and the rectangle image blocks applied The ninth embodiment will now be described specifically with reference to a block diagram of FIG. 19. The coding part in the ninth embodiment has a fixed-length coding part 402 which outputs code words of predetermined fixed length on an original image having undergone block dividing operation performed, based on the output of halftone-dot classification performed by a halftone-dot classification part 401 which classifies the original image in which halftone dots and line drawings are mixed, and, also, a fixed-length decoding part 403 which performs decoding also according to the result of the above-mentioned halftone-dot classification part 401.

Moreover, the fixed-length coding part 402 has an encoder 406 and an encoder 407, and outputs of the encoder 406 and 407 are switched based on the halftone-dot classification part 401. The data of these encoder 406 and 407 is input into a selector 404. The fixed-length decoding part 403 has a decoder 408 and a decoder 409, and the outputs of the decoder 408 and decoder 409 are switched based on the output of the halftone-dot classification part 401. Similarly, the output data of these decoder 408 and 409 is input into a selector 410 which sends out the image data after decoding (decompression).

The encoder 406 is especially used for picture image parts which include halftone dots, and the encoder 407 is especially used for edge images of characters/letters, etc. It is preferable to code a picture part having continuous gray scale or halftone-dot parts by means of the coding part 406. On the other hand, as for character parts, it is preferable to code them by means of the coding part 407 superior in terms of preservability of edges. These encoders 406 and 407 are the same as those in the above-described embodiments, and duplicated description is omitted.

Moreover, as to the halftone-dot classification part 401, the halftone-dot classification method disclosed by Japanese patent No. 2777379, for example may be applied. Further, as long as a method of classifying halftone-dot region from an image in which halftone-dot image and line-drawing image are mixed, any other method may also be applied.

Furthermore, according to the ninth embodiment of the present invention, as shown in Table 4, i.e., a correspondence table between result of halftone-dot classification and coding scheme to be applied, coding is performed in a manner determined according to the result of halftone-dot classification. Specifically, when the result of halftone-dot classification is "halftone dots", the encoder 406 performs the coding concerned and it performs down-sampling after band-pass filter processing. On the other hand, when the halftone-dot classification result is of "not halftone dots", the coding concerned is performed by the encoder 407, namely, the maximum-and-minimum average approximating method is performed.

TABLE 4

| CLASSIFY RESULT | APPLIED CODING SCHEME |
|---|---|
| HALFTONE | ENCODER 406: BAND-PASS FILTER AND DOWN-SAMPLING |
| NON-HALFTONE | ENCODER 407: MAX-AND-MIN AVERAGE APPROXIMATION |

Next, a coding device in a tenth embodiment of the present invention will now be described with reference to a block diagram of FIG. 20. In this embodiment, an encoder 412 performs filter processing with a band-pass filter 413, and, subsequently performs down-sampling by a down-sampling part 414. Moreover, by a coding part 415, coding processing according to a maximum-and-minimum average approximating method 416 is performed.

The processing data output from these encoders 412, 415 is supplied to a selector 404. When resolution of the present scanner is set to 600 dip, the above-mentioned down-sampling means sub-sampling of an image read by this scanner into 300 dpi. Then, the Nyquist frequency of the data having undergone the sub-sampling into 300 dpi becomes 150 lpi. That is, since the frequency component of 150 lpi or more does not fulfill the sampling theorem, it should be removed by the band-pass filter previously.

Figures 20, 21:
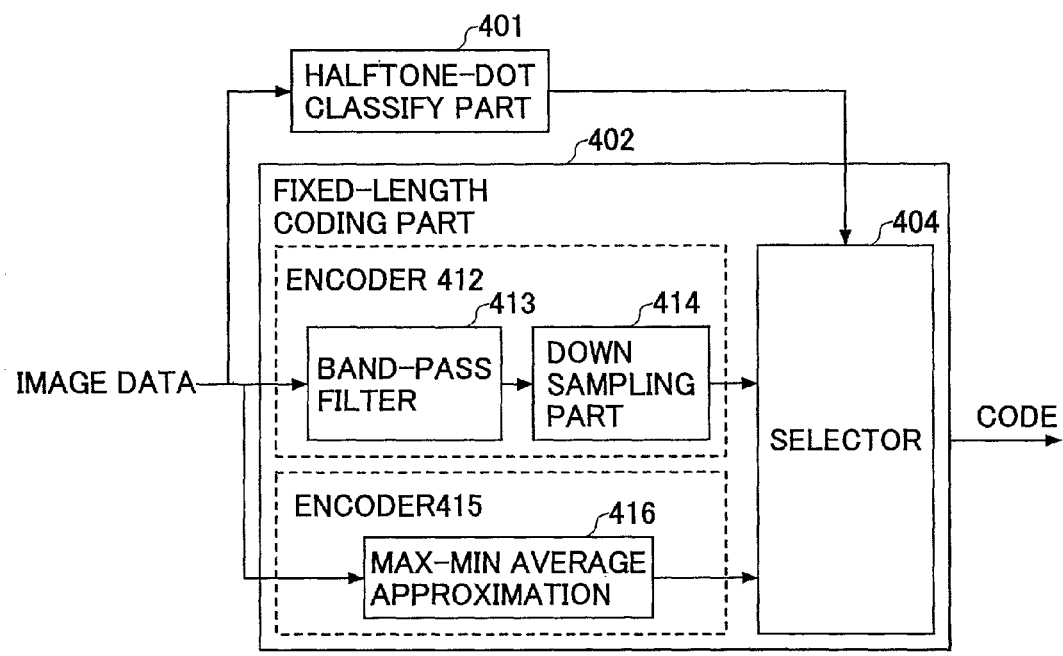
FIG. 20 is a block diagram showing a configuration of a coding device in a tenth embodiment of the present invention.
FIG. 21 shows a configuration of a band-pass filter in a configuration of FIG. 20.

An example of coefficients of this band-pass filter 413 is shown in FIG. 21. Moreover, the frequency characteristic of the band-pass filter coefficients shown in FIG. 21 is shown in FIG. 22. As can be seen from FIG. 22, the frequency characteristic values on 150 lpi or more are smaller, and, as described above, it can be seen therefrom that the frequency components of 150 lpi or more which do not fulfill the sampling theorem of down-sampling are restricted in level.

Figure 23:
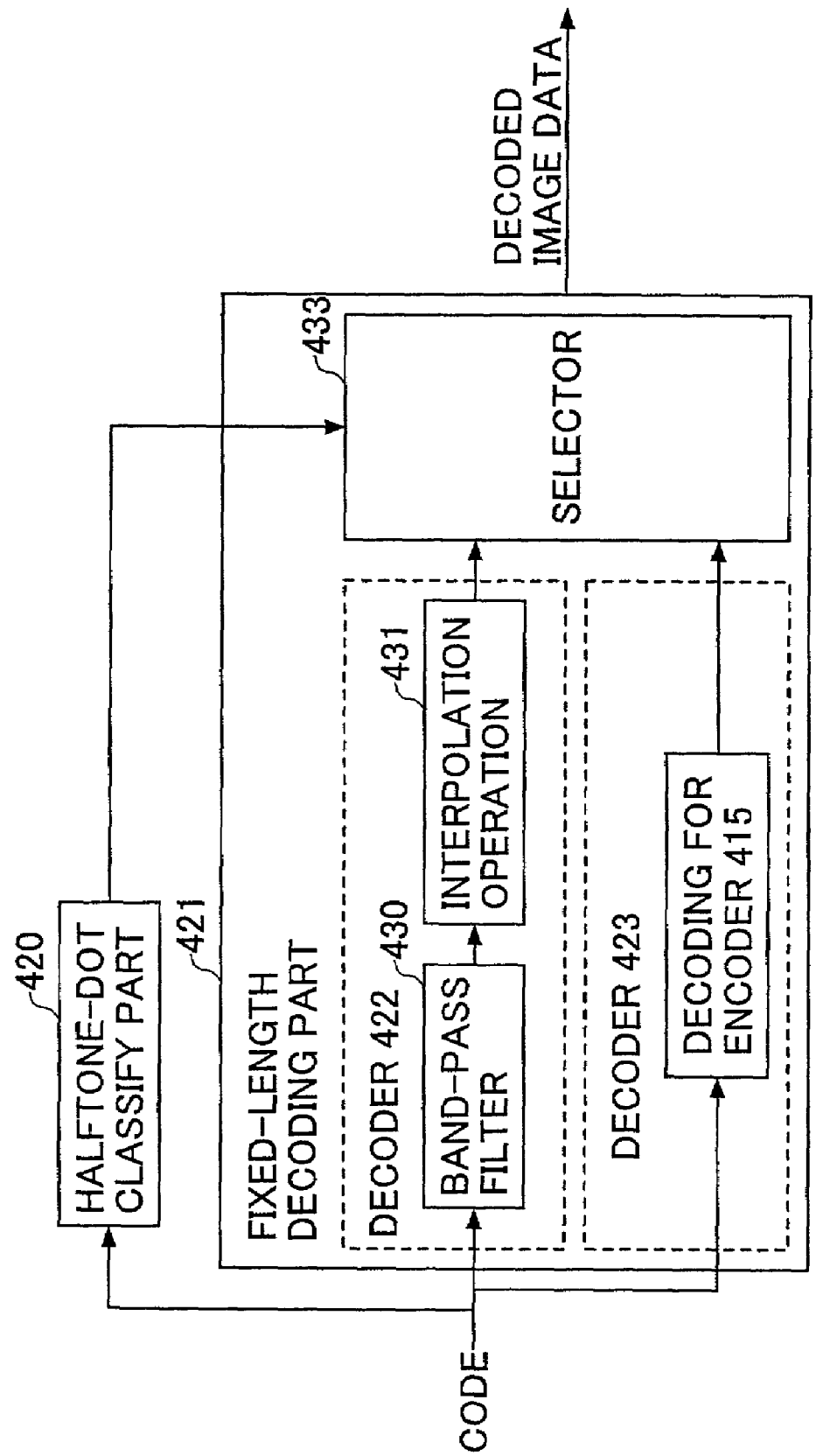
FIG. 23 is a block diagram showing a configuration of a coding device in an eleventh embodiment of the present invention.

Next, a decoding device in an eleventh embodiment of the present invention will now be described with reference to a block diagram of FIG. 23. As shown in FIG. 23, this decoding device included a fixed-length decoding part 421 which performs decoding according to a halftone-dot classification result by a halftone-dot classification part 420 which classifies a halftone-dot region from given coded data of image in which halftone-dot image and line drawing are mixed.

The fixed-length decoding part 421 has a decoder 422 and a decoder 423, and whether the decoder 422 or the decoder 423 is applied is determined according to the output result of the halftone-dot classification part 420. In the decoder 422, filtering by a band-pass filter 430 and interpolation by an interpolation part 431 are performed, and, then, the thus-processed data is output to a selector 433. The decoder 423 performs decoding processing corresponding to the coding processing of the above-mentioned encoder 415. That is, the decoder 422 is a decoder corresponding to the encoder 412 mentioned above. Moreover, the decoder 423 is a decoder corresponding to the encoder 415 mentioned above. That is, the decoder 422 is specifically prepared for picture image parts which include halftone dots, while the decoder 423 is specially prepared for edge images including characters/letters, etc. As to the configuration of the decoders 422, 423, since it is the same as that of the configuration in each embodiment described above, duplicated description is omitted.

Figure 19:
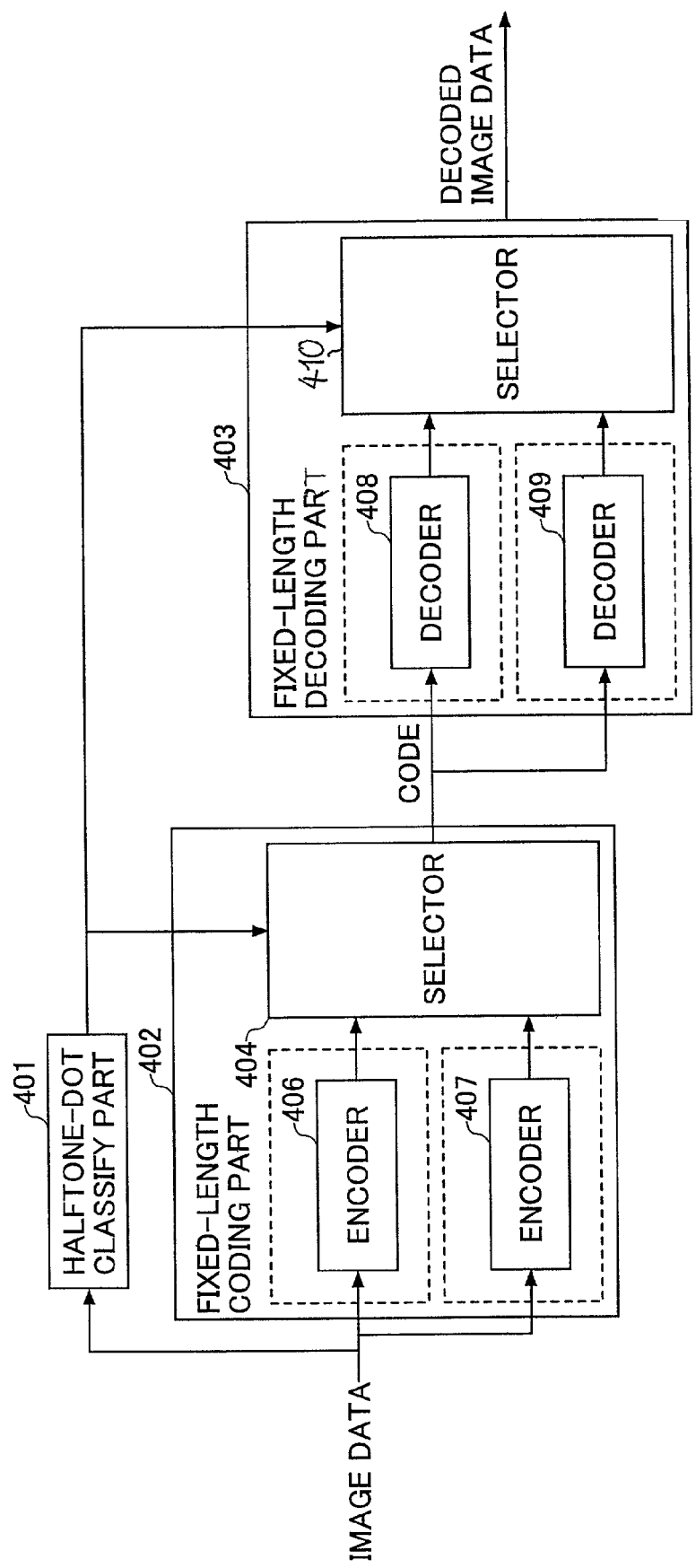
FIG. 19 is a block diagram showing a configuration of a coding and decoding device in a ninth embodiment of the present invention.

Moreover, the halftone-dot classification part 420 is actually a common part as the halftone-dot classification part 401 shown in FIGS. 19 and 20. Accordingly, it can determine whether the relevant coded data is of image data determined as of halftone dots or not of halftone dots.

In the decoder 422, processing by a band-pass filter 430 is performed, and interpolation operation by an interpolation operation part 431 is performed further. Halftone dots included in general image are of around 150 dpi. Since halftone dots exceeding this spatial frequency are removed by smoothing of the band-pass filter 413 of the encoder 412 mentioned above, turn Moiré (or aliasing) which does not fulfill the sampling theorem by the down-sampling does not occur theoretically. However, since the filter size is limited, it may be difficult to configure an ideal band-pass filter, and turn Moiré (or aliasing) may occur as a result.

The frequency characteristic of the ideal band-pass filter is shown in FIG. 24. That is, the frequency characteristic value up to 150 lpi is 1.0, and is 0 on or more than 150 lpi, as seen from the figure.

As mentioned above, FIG. 22 shows the frequency characteristic of the band-pass filter 413 having the coefficients shown in FIG. 21. As can be seen therefrom, in comparison to FIG. 24 in frequency characteristics, the frequency characteristic value is not 0 on or more than 150 lpi in FIG. 22. Accordingly, actually, frequency components more than 150 lpi remain, and, thus, turn Moiré (or aliasing) occurs due to down-sampling.

Then, as mentioned above, the band-pass filter 430 is provided in the eleventh embodiment, and, thereby, turn Moiré (or aliasing) which cannot be removed by the band-pass filter 413 (FIG. 21) is removed thereby. Then, halftone dots having a spatial frequency lower than 150 lpi are reproduced by the interpolation operation 431.

Figure 25:
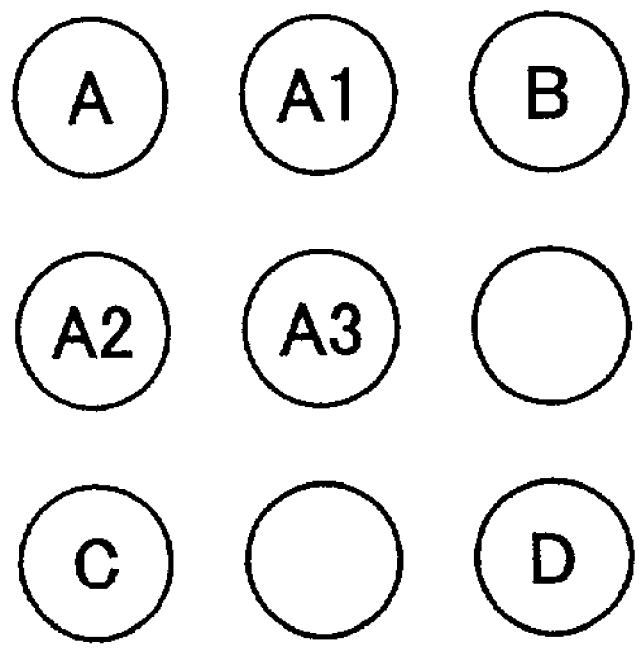
FIG. 25 illustrates a linear interpolation method.

FIG. 25 is a diagram illustrating linear interpolation processing applicable to the above-mentioned interpolation part 431. The linear interpolation processing is the same as the processing described above using FIG. 11. In addition, as the interpolation scheme to be applied in the interpolation part 431 may also be cubic-function convolution interpolation scheme, or another interpolation scheme may be applied.

Figure 26:
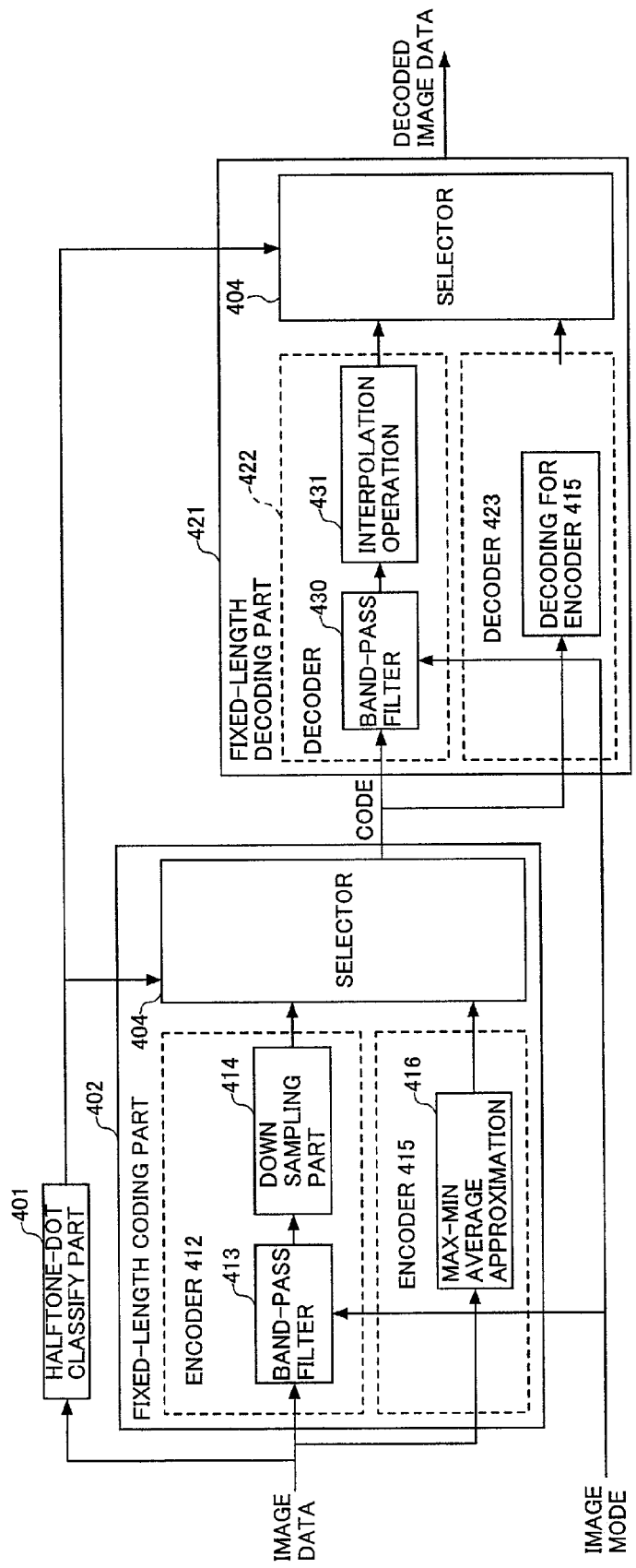
FIG. 26 is block diagram showing a configuration of a coding and decoding device in a twelfth embodiment of the present invention.

Next, a coding and decoding device in a twelfth embodiment of the present invention will now be described with reference to a block diagram of FIG. 26. According to this embodiment, coefficients of the band-pass filters 413, 430 of each of the fixed-length coding part 402 and the fixed-length decoding part 421 are controlled according to an image processing mode selected by an operator from an operation part.

For example, the frequency characteristic of the band-pass filter 413 is shown in FIG. 22, and, since it is not a filter which has an ideal band restriction performance as mentioned above, there is a possibility that turn Moiré (or aliasing) may occur. In order to reduce turn Moiré (or aliasing), although the filter size is enlarged, filter coefficients such as those shown in FIG. 27 may be used. FIG. 28 shows the frequency characteristic thereof, and, as can be seen therefrom, by using this filter, compared with the above-mentioned FIG. 22, the frequency characteristic value on 150 lpi or more is smaller.

Figure 29:
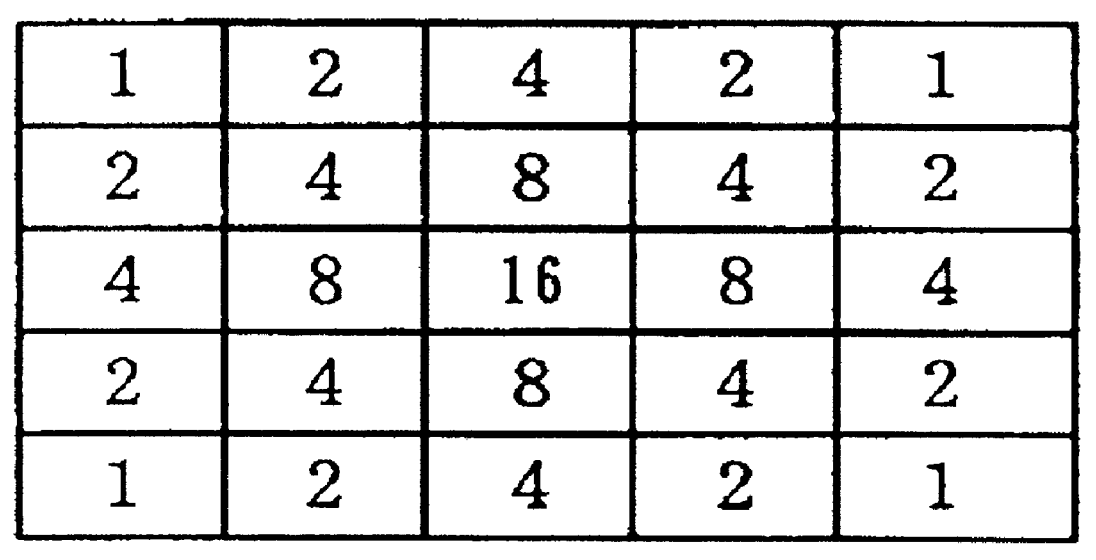

Furthermore, FIG. 29 shows an example of coefficients of the band-pass filter 413 configured for a case where turn Moiré (or aliasing) should be reduced without enlarging the filter size, and FIG. 30 shows the frequency characteristic thereof. Although the frequency component on 150 lpi or more is smaller as compared with FIG. 22 as for the frequency characteristic of the filter coefficients shown in FIG. 30, the frequency characteristic value on low frequency component is also small. Since low frequency components include text etc., the filter concerned cannot be used well for the character image processing mode. However, since turn Moiré (or aliasing) occurs on the band-pass filter with the frequency characteristic of FIG. 22 in the case a user regards picture image as important, setting is made such that the band-pass filter causing less Moiré and thus having the frequency characteristic shown in FIG. 30 is applied.

Any other filter coefficients may be applied to the band-pass filter to be made suitable for the image processing mode selected by an operator (user) from the operation part. For example, when the character image processing mode is chosen, such filter coefficients are applied that, thereby, frequency components of 150 lpi or more should remain a little, while turn Moiré (or aliasing) may occur, but, low frequency components including text (character) information should positively remain. On the other hand, in case of the photograph image processing mode is selected so that picture image is regarded important, filter coefficients are applied such that, thereby, frequency components on 150 lpi or more should be nearly zero, and, thus, low frequency components of text or character should not be regarded.

Figure 31:
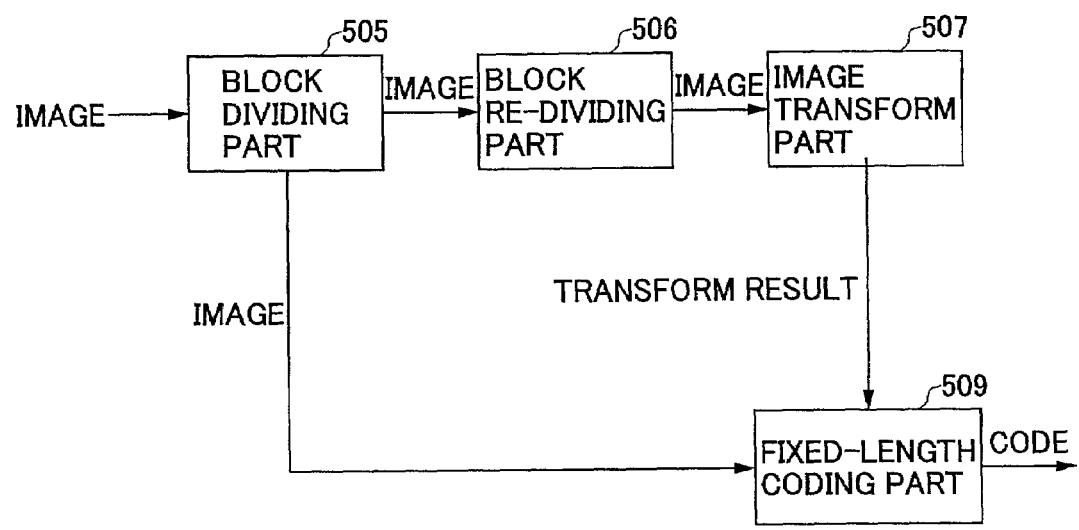
FIG. 31 is a block diagram showing a configuration of a coding device in a thirteenth embodiment of the present invention.

A configuration of a thirteenth embodiment of the present invention will now be described. A coding device in this embodiment includes a block dividing part 505, a block re-dividing part 506, an image transform part 507, and a fixed-length coding part 509, as shown in FIG. 31. These parts are the same as those of the respective embodiments described above. For example, these parts are the same as the block dividing part 301 block re-dividing part 306, image transform part 307, and fixed-length coding part 309 shown in FIG. 15, respectively, and duplicated description is omitted.

Figure 32:
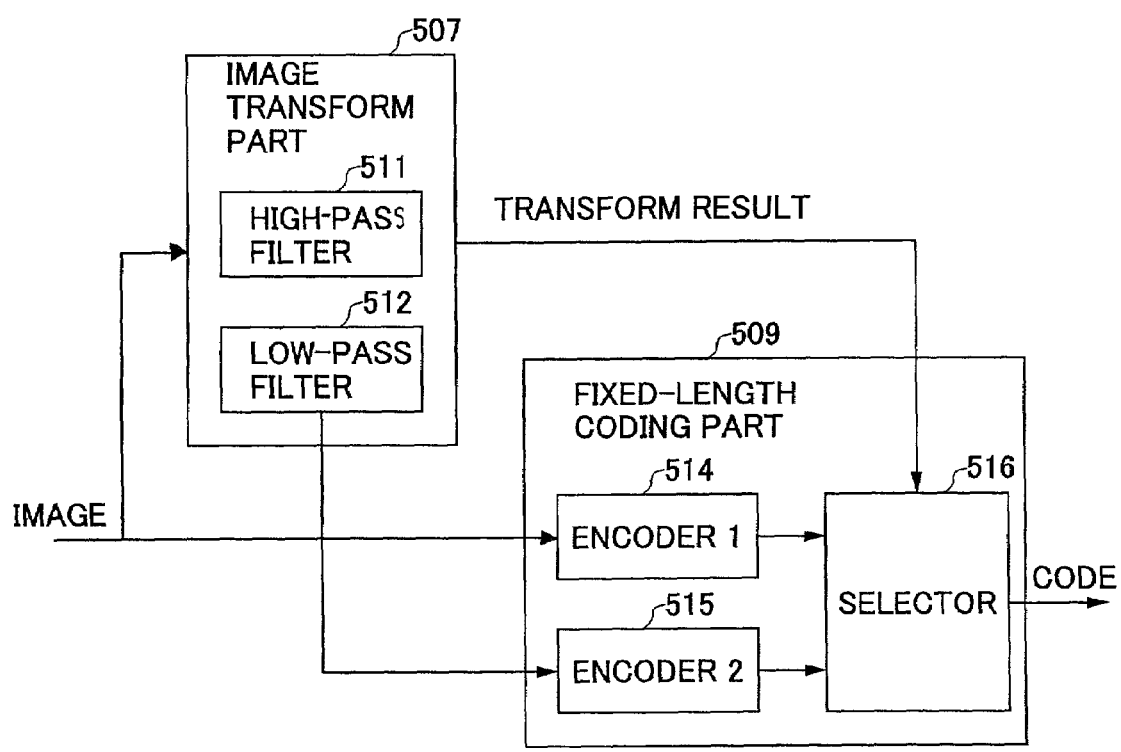
FIG. 32 is a block diagram showing a configuration of an image transform part and a fixed-length coding part in a configuration of FIG. 31.

FIG. 32 shows the above-mentioned image transform part 507 and fixed-length coding part 509 in detail. These configurations are the same as those of the above-mentioned embodiments. For example, they are the same as the image transform part 213 and fixed-length coding part 217 shown in FIG. 8. The image data input is input into the image transform part 507 which includes a high-pass filter 511 and a low-pass filter 512. An encoder 501 and an encoder 502 are selectively applied according to the output of the high-pass filter 511 and the output of the low-pass filter 512.

The encoder 501 is in particular prepared for picture image parts which include halftone dots. The encoder 502 is in particular prepared for edge images of text/characters, etc. As for a picture having continuous gray scale, coding by the encoder 501 is preferable. Since an image block having a large output of the high-pass filter 511 is a block containing many edges, such as characters, coding by the encoder 502 superior in terms of preservability of edges is applied. Since an image block having a large output of the low-pass filter is a gray scale image which includes smooth halftone dots or a continuous gray scale, the encoder 501 which performs faithful preservation of halftone dots is used. The configuration of these encoder 501, 502 is the same as that of those in each of the above-mentioned embodiments, and duplicated description is omitted.

Since the encoder 502 is specially prepared for edge images such as text/character images, etc. as mentioned above, a block determined as being edge from the transform result from the image transform part 507 is coded thereby. The maximum-and-minimum average approximating method is applied as a coding scheme on the encoder 502. The maximum-and-minimum average approximating method will now be described.

The maximum value (Max) and the minimum value (Min) in a block concerned are taken first. Then, the average value (TH=(Max+Min)/2) of Max and Min is calculated. Then, the average value of the pixel values more than this TH is calculated and is referred to as A-high, and the average value of the pixel values below TH is calculated and is referred to as A-low. Then, each pixel with a larger pixel value than TH is replaced with A-high and each pixel value smaller than TH is replaced with A-low, uniformly. Thus, coding (compression) is achieved. In this case, the threshold (TH) used at the time of calculating the two representation values A-high and A-low is the same as the threshold (TH) used for assignment of code value on each pixel in the related art.

An example of pixel value data of pixels of an image block determined as being an edge block is shown in FIG. 33A. FIG. 33B illustrates an example of coded result on the example of FIG. 33A according to the above-mentioned maximum-and-minimum average approximating method. Further, FIG. 33C plots the pixel values according to FIGS. 33A and 33B.

The Max value of the pixel values in the block of FIG. 33A is 153, and the Min value is 12. Since TH is the average value of the Max value and Min value, (153+12)/2=82 Since A-high is the average value of the pixel values beyond TH=82, $$A\text{-high}=(89+89+96+153+153+152+143)/7$$

Since A-low is the average value of the pixel values below TH, $$A\text{-low}=(14+12+17+24+78+81+72+64+54)/9$$

As shown in FIG. 33B, as each pixel value more than TH=82 is coded into A-high, while each pixel value lower than TH is coded into A-low, the image data shown in FIG. 33A is coded into coded data shown in FIG. 33B. The portion on fine hatching is of A-high value, while the portion on coarse hatching is of A-low value.

FIG. 33C plots these pixel values, and shows which representation value each pixel is coded into. Fine hatching shows the pixel value coded into the A-high value while coarse hatching shows the pixel value coded into the A-low value, as in FIG. 33B.

In the case of this example, the code assignment threshold TH is also 82. Since the pixel value 81 and 78 are slightly less than this code assignment threshold TH, they are coded as the A-low value each, as indicated by FIG. 33C. In such a case, these pixels may turn into pixels of too light tone after being decoded (decompressed), and a line patchy phenomenon or the like may occur as a result.

Figures 34A, 34B:
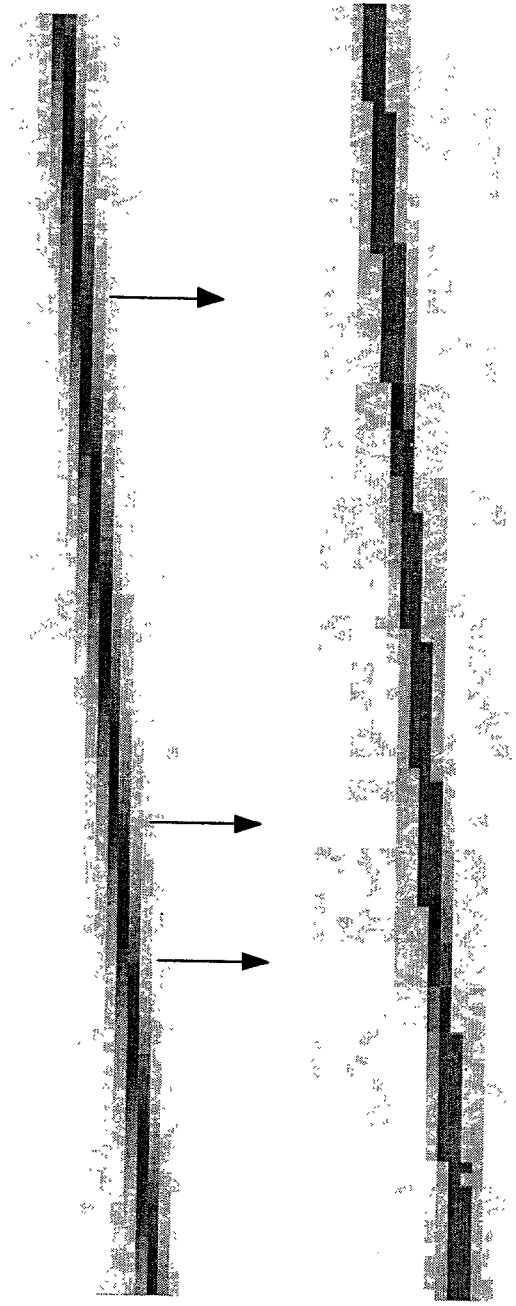

An example of this line patchiness is shown in FIGS. 34A and 34B. FIG. 34A shows image data of a line drawing part after scanner input, and FIG. 34B shows the image data obtained when it is decoded after coded by the above-described processing. When the parts indicated by arrows in the figures are observed, only 1 pixel of each of these portions is coded as the A-high value, while all the peripheral pixels are coded as the A-low value. This is because, as described above, pixels slightly below the threshold are coded into A-low value, and, such phenomenon may thus cause line patchiness or the like.

In order to solve this problem, strong filtering processing may be performed in decoding. However, since such an operation may adversely affect reproduction of halftone-dot image parts, it is not preferable.

According to the thirteenth embodiment of the present invention, in order to solve this problem, for a block determined as being edge, a certain predetermined parameter value is subtracted from the above-mentioned code assignment threshold TH, and, the subtraction result is referred to as a new second code assignment threshold, and is used actually for code assignment. Pixels which were coded into the A-low value (smaller value) and would cause line patchiness in the related art as being slightly lower than the original code assignment threshold are then coded into the A-high value (larger value) according to the thirteenth embodiment of the present invention which thus lowers the threshold for this purpose. Accordingly, line patchiness can be effectively avoided. Moreover, according to this scheme, no adverse influence occurs onto an image part determined as being non-edge.

Specifically, as described above, in case a relevant block is determined as being edge and is coded, the value resulting from subtraction of the predetermined parameter value from the above-mentioned code assignment threshold is actually used for code assignment. Consequently, a good image can be obtained on a character/text part and a line drawing part, without occurrence of line patchiness.

Furthermore, it also becomes possible as a variant embodiment to achieve coding processing suitable for a particular region, by determining whether or not subtracting a predetermined parameter value from a code assignment threshold is performed, according to a character/text region determining/classifying result.

Furthermore, it is also possible to consider a configuration which can obtain a good quality of image which an operator desires, by carrying out controlling of the above-mentioned predetermined parameter value to be subtracted from the code assignment threshold as another variant embodiment, according to an image processing mode selected by an operator from an operation part.

Figure 35:
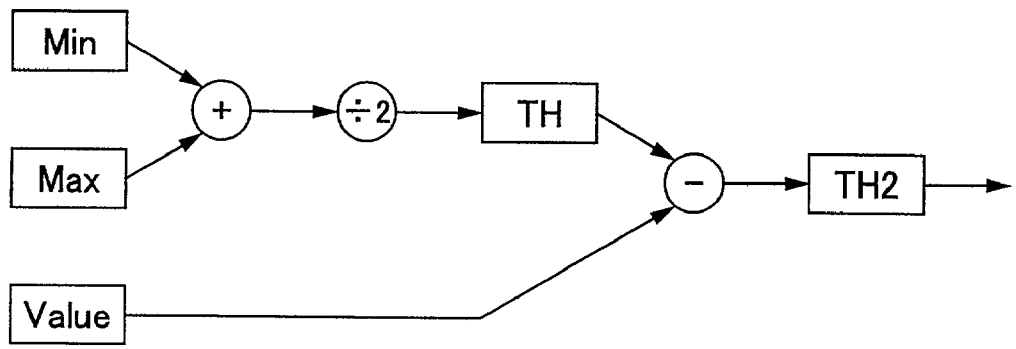

The thirteenth embodiment will now be described in detail. In the code assignment threshold used by the above-mentioned maximum-and-minimum average approximating method, FIG. 35 illustrates operation of the coding device in the thirteenth embodiment of the present invention, in which a predetermined parameter value is subtracted from a code assignment threshold, and, thus, a second code assignment threshold is obtained which is actually used for code assignment. FIG. 35 specifically illustrates operation of calculating the threshold used for the above-mentioned code assignment processing in the encoder 515 in this embodiment.

That is, the maximum value (Max) and the minimum value (Min) in an image block are taken first. Then, the sum of the maximum value (Max) and the minimum value (Min) in the block is divided by 2 so that a first threshold TH used at the time of calculating representation values is calculated.

$TH=(Max+Min)/2$

Then, the average value of the pixel values more than TH in the block concerned is calculated and is referred to as A-high, while the average value of the pixel values below TH is calculated and is refereed to as A-low. Next, a predetermined parameter value Value is subtracted from this TH, and, the subtraction result is referred to as a second new code assignment threshold TH2.

$TH2=TH-\text{Value}$

Then, the above-mentioned code assignment processing is performed using the TH2. That is, each pixel value larger than TH2 is uniformly coded to be A-high, while each pixel value lower than TH2 is uniformly coded into A-low. Thus, although the threshold used at the time of calculating the representation values A-high and A-low is the same TH as in the related art, the second code assignment threshold (TH2) is obtained as a result of the predetermined parameter value Value being subtracted from the first threshold TH, and the second threshold TH2 is actually used for the code assignment operation.

The example of the pixel value data determined as being an edge block same as that shown in FIG. 33A is again shown in FIG. 36A, an example of coded data obtained from the pixel values of FIG. 36A by the maximum-and-minimum average approximating method by the thirteenth embodiment of the present invention described above is shown in FIG. 36B, and a graph plotting according to FIGS. 36A and 36B is shown in FIG. 36C.

Also in this case, the Max is 153 and Min is 12, and, since TH is the average value of Max and Min, $TH=(153+12)/2=82$ Since A-high is the average value of the pixel values higher than TH, $A\text{-high}=(89+89+96+153+153+152+143)/7$ Since A-low is the average value of the pixel values below TH, $A\text{-low}=(14+12+17+24+78+81+72+64+54)/9.$ Next, code assignment is performed, and the code assignment threshold in this case is $TH2=TH-\text{Value}$ Assuming that Value is set to 10, $TH2=82-10=72$ Accordingly, the newly calculated second code assignment threshold is set to 72.

Consequently, the code value on each pixel with a larger pixel value than TH2=72 is uniformly coded into A-high, and the code value of each pixel with a pixel value smaller than 72 is uniformly coded into A-low. Consequently, the image data of FIG. 36A is coded as shown in FIG. 36B. FIG. 36C plots a pixel values and shows, by different hatching style, into which representation values each pixel is coded. Fine hatching shows the pixel value coded into A-high value, and coarse hatching shows the pixel value coded into A-low value, as in FIG. 36B.

Since the second newly calculated code assignment threshold is such as TH2=82−10 so that, as can be seen from FIG. 36C, the pixels enclosed by the thick line in FIG. 36B were coded into A-low value according to the related art as shown in FIGS. 33A through 33C, but are coded into A-high by using the code assignment threshold (TH2) newly calculated according to the thirteenth embodiment. Consequently, the pixels which were coded into A-low value and causes line patchiness as being slightly lower than the code assignment threshold can be then coded into A-high value on the second code assignment threshold obtained as a result of the predetermined parameter value being subtracted from the original one. Thus, line patchiness can be effectively avoided.

Figure 37:
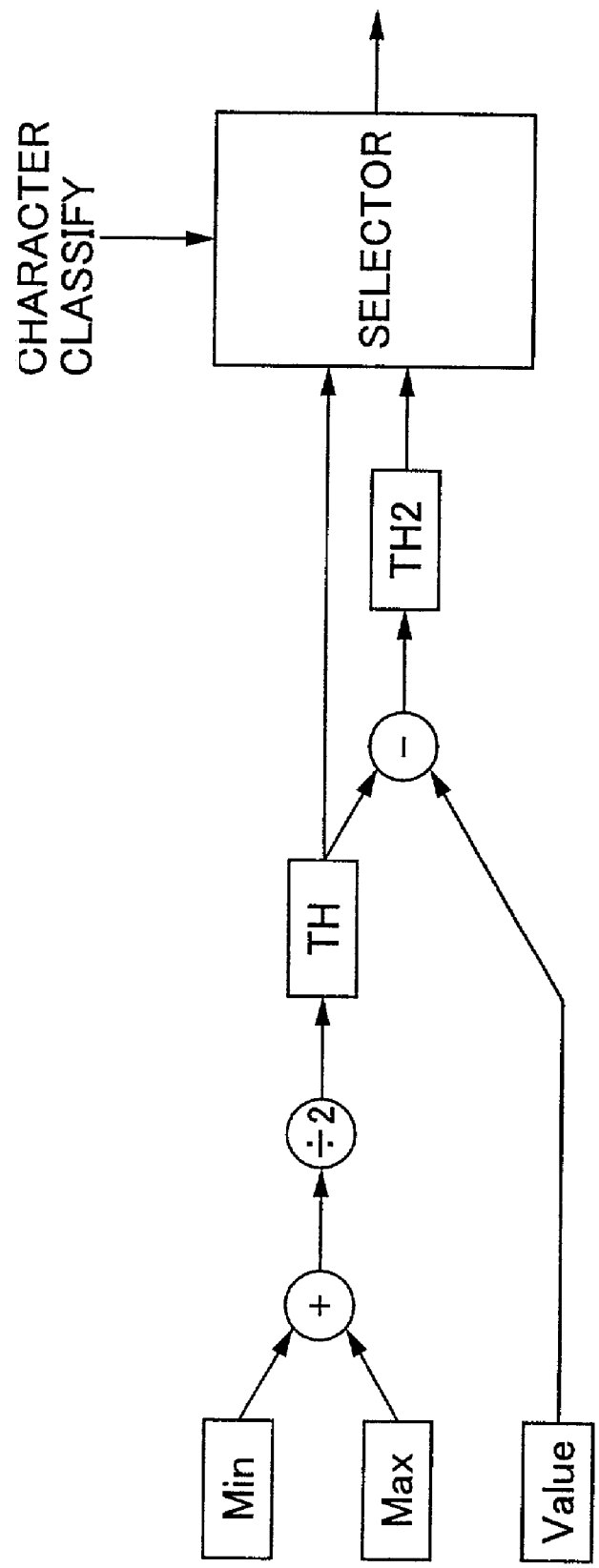
FIG. 37 illustrates a first variant embodiment of the thirteenth embodiment of the present invention.

FIG. 37 shows a first variant embodiment of the thirteenth embodiment and illustrates operation of a coding device in which whether or not a predetermined parameter value is subtracted from the above-mentioned code assignment threshold is determined according to a character region determining result. This block diagram is the same as that in FIG. 35, except that whether either TH or TH2 is chosen is determined according to the character region determining result.

As to the character region determination/classification, a well-known scheme of classifying character regions from an image in which character regions and halftone-dot regions are mixed may be applied. For example, when it is determined that a relevant image part is not of halftone dots as a result of the halftone-dot classification by the halftone-dot classification part in the above-mentioned embodiments, it can be determined that the relevant image part is of a character region. When a relevant image part is determined as being of a character region, TH2 is selected. On the other hand, when a relevant image part is determined as being of a region other than character region, TH is selected.

That is, when the character region determining result is a character determination, since TH2 is chosen as the code assignment threshold, line patchy phenomenon or the like is prevented effectively.

Figure 38:
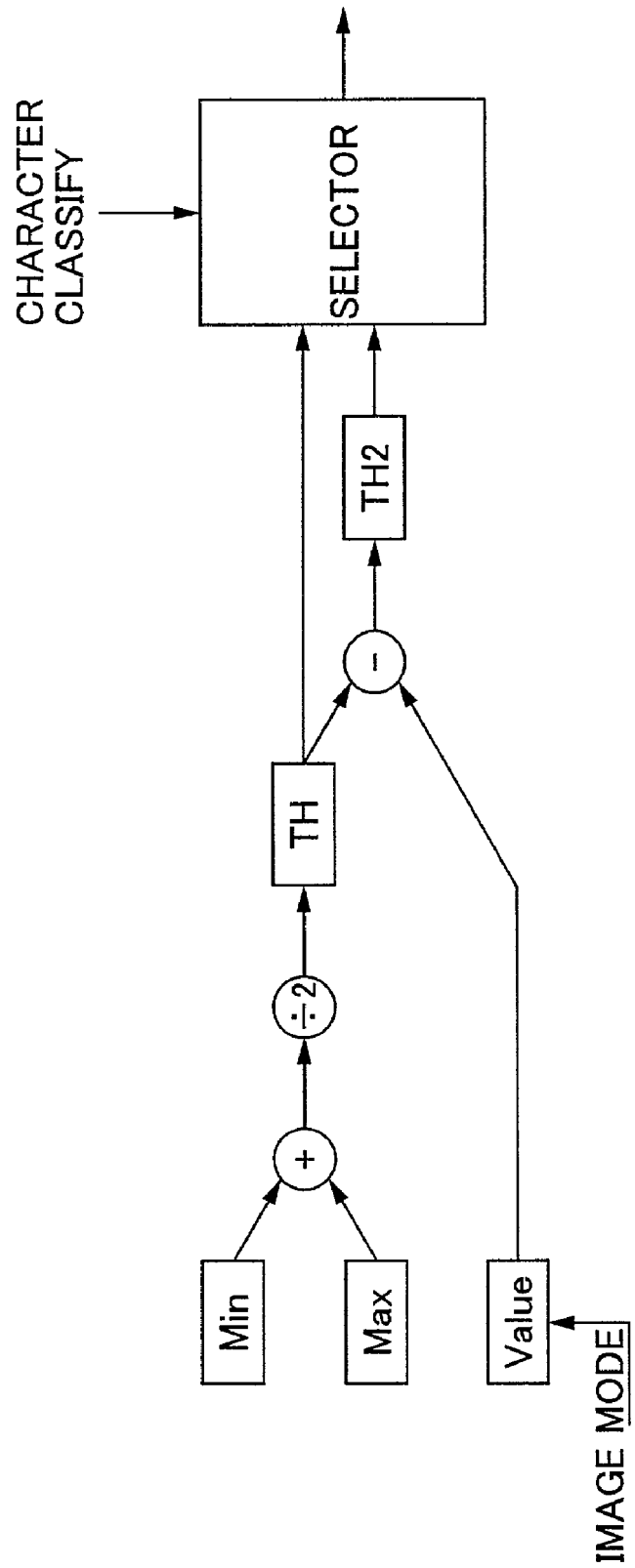
FIG. 38 illustrates a second variant embodiment of the thirteenth embodiment of the present invention.

Furthermore, FIG. 38 shows another variant embodiment of the thirteenth embodiment in which the parameter value Value to be subtracted from the original code assignment threshed is controlled according to an image processing mode selected by an operator from an operation part. Table 5 shows an example of the variation of the above-mentioned parameter value Value controlled according to the image processing mode.

TABLE 5

| SELECTED MODE | CHARACTER | CHARACTER/ PHOTOGRAPH | PHOTOGRAPH |
|---|---|---|---|
| PARAMETER VALUE | 20 | 10 | 5 |

That is, when the character mode is chosen, in order that as many pixels as possible should be coded into A-high value, the above-mentioned parameter value Value to be subtracted from the original threshold TH is increased, so that line patchiness be avoided effectively. In the case of the photograph mode, this Value is made small conversely.

Consequently, it is possible to make a high definition image reproducible, as line patchiness phenomenon can be prevented effectively in the case of document image with many characters, etc, while influence of the subtraction operation is prevented from occurring in a case of a photograph image or the like.

Thus, according to the present invention, a high-definition image can be reproduced by applying effective coding and decoding schemes according to the characteristic of an input image, without losing the feature of the input image, with preventing effectively occurrence of Moiré which tends to occur on reproduction of a halftone-dot image.

Further, the present invention is not limited to the above-described embodiments, and variations and modifications may be made without departing from the scope of the present invention.

The present application is based on Japanese priority applications. Nos. 2001-77425, 2001-80575 and 2001-246878, filed on Mar. 19, 2001, Mar. 21, 2001 and Aug. 16, 2001, respectively, the entire contents of which are hereby incorporated by reference.

What is claimed is:

1. A coding and decoding method, comprising the steps of:
    a) classifying an input multi-level image into edge parts and non-edge parts according to edge degree thereof;
    b) coding the input multi-level image according to a coding scheme different between the edge parts and non-edge parts; and
    c) decoding coded data according to a linear interpolation scheme for generating pixel values included in the non-edge part.

2. The method as claimed in claim 1, wherein, when a picture regarding mode is selected, the input image is coded according to a coding scheme prepared for the non-edge parts is applied regardless of result of said step a).

3. A coding and decoding method, comprising the steps of:
    a) classifying an input multi-level image into edge parts and non-edge parts according to edge degree thereof;
    b) coding the input multi-level image according to a coding scheme different between the edge parts and non-edge parts; and
    c) decoding coded data according to a cubic-function convolution interpolation scheme for generating pixel values included in the non-edge part.

4. The method as claimed in claim 3, wherein, when a picture regarding mode is selected, the input image is coded according to a coding scheme prepared for the non-edge parts is applied regardless of result of said step a).

5. A coding and decoding method, comprising the steps of:
    a) classifying an input multi-level image into edge parts and non-edge parts according to edge degree thereof;
    b) coding the input multi-level image according to a coding scheme different between the edge parts and non-edge parts; and
    c) decoding coded data according to an interpolation scheme having smoothing performance for generating pixel values included in the non-edge part.

6. The method as claimed in claim 5, wherein, when a picture regarding mode is selected, the input image is coded according to a coding scheme prepared for the non-edge parts is applied regardless of result of said step a).

7. A coding method comprising the steps of:
    a) dividing an input multi-level image into a plurality of blocks, and determining whether each block is an edge block or a non-edge block according to edge degree thereof;
    b) coding the input multi-level image according to a coding scheme different between the edge blocks and non-edge blocks; and
    c) classifying the input multi-level image into a halftone-dot part mainly including halftone dots and the other non-halftone-dot part,
    wherein said step b) controls the coding scheme according to the result of classification in said step c).

8. A coding method comprising the steps of:
a) dividing an input multi-level image into a plurality of blocks, and determining whether each block is an edge block or a non-edge block according to edge degree thereof;
b) coding the input multi-level image according to a coding scheme different between the edge blocks and non-edge blocks; and
c) classifying the input multi-level image into a halftone-dot part mainly including halftone dots and the other non-halftone-dot part,
wherein said step a) controls a determination threshold thereof according to the result of classification in said step c).

9. A coding method comprising the steps of:
a) dividing an input multi-level image into a plurality of blocks, and determining whether each block is an edge block or a non-edge block according to edge degree thereof;
b) coding the input multi-level image according to a coding scheme different between the edge blocks and non-edge blocks; and
c) classifying the input multi-level image into a halftone-dot part mainly including halftone dots and the other non-halftone-dot part,
wherein said step a) controls a determination threshold thereof according to the result of classification in said step c) and a set image characteristic mode.

10. A coding and decoding method comprising the steps of:
a) dividing an input multi-level image into a plurality of blocks, and determining whether each block is an edge block or a non-edge block according to edge degree thereof;
b) coding the input multi-level image according to a coding scheme different between the edge blocks and non-edge blocks;
c) classifying the input multi-level image into a halftone-dot part mainly including halftone dots and the other non-halftone-dot part; and
d) decoding coded data obtained from said step b),
wherein:
said step b) controls the coding scheme according to the result of classification in said step c); and
said step d) controls a decoding scheme according to the result of classification in said step c).

11. The coding and decoding method as claimed in claim 10, wherein said step b) comprises the steps of a1) restricting a frequency band of the image data on the non-edge block, and a2) performing down-sampling on the image data having undergone said step a1).

12. The coding and decoding method as claimed in claim 10, wherein said step d) comprises the steps of d1) restricting a frequency band of the coded data on the non-edge block, and d2) obtaining pixel values through interpolation operation therefrom.

13. The coding and decoding method as claimed in claim 11, wherein said step a1) controls filter coefficients applied according to a set image characteristic mode.

14. The coding and decoding method as claimed in claim 12, wherein said step d1) controls filter coefficients applied according to a set image characteristic mode.

15. A coding method comprising the steps of:
a) dividing an input multi-level image into a plurality of blocks, and determining whether each block is an edge block or a non-edge block according to edge degree thereof; and b) coding the input multi-level image according to a coding scheme different between the edge blocks and non-edge blocks,
wherein said step b), for the edge block, obtains an average of maximum value and minimum value in pixel value on each block as a first code assignment threshold, subtracts a predetermined value from the first code assignment threshold so as to obtain the subtraction result as a second code assignment threshold, and performs coding by using the second code assignment threshold as a reference therefor.

16. The coding method as claimed in claim 15, further comprising the step of c) determining whether an image region is a character image region mainly including a character, wherein said step b) performs coding by using the second code assignment threshold when the input image region is the character image region, while otherwise using the first code assignment threshold.

17. The coding method as claimed in claim 15, further comprising the step of c) controlling the predetermined value according to a set image characteristic mode.

18. A coding and decoding device, comprising:
a part classifying an input multi-level image into edge parts and non-edge parts according to edge degree thereof;
a part coding the input multi-level image according to a coding scheme different between the edge parts and non-edge parts; and
a part decoding coded data according to a linear interpolation scheme for generating pixel values included in the non-edge part.

19. The device as claimed in claim 18, wherein, when a picture regarding mode is selected, the input image is coded according to a coding scheme prepared for the non-edge parts is applied regardless of result of classification of said classifying part.

20. A coding and decoding device, comprising:
a part classifying an input multi-level image into edge parts and non-edge parts according to edge degree thereof;
a part coding the input multi-level image according to a coding scheme different between the edge parts and non-edge parts; and
a part decoding coded data according to a cubic-function convolution interpolation scheme for generating pixel values included in the non-edge part.

21. The device as claimed in claim 19, wherein, when a picture regarding mode is selected, the input image is coded according to a coding scheme prepared for the non-edge parts is applied regardless of result of classification of the classifying part.

22. A coding and decoding device, comprising:
a part classifying an input multi-level image into edge parts and non-edge parts according to edge degree thereof;
a part coding the input multi-level image according to a coding scheme different between the edge parts and non-edge parts; and
a part decoding coded data according to an interpolation scheme having smoothing performance for generating pixel values included in the non-edge part.

23. The device as claimed in claim 22, wherein, when a picture regarding mode is selected, the input image is coded according to a coding scheme prepared for the non-edge parts is applied regardless of result of classification of said classifying part.

24. A coding device comprising:
a part dividing an input multi-level image into a plurality of blocks, and determining whether each block is an edge block or a non-edge block according to edge degree thereof;
a part coding the input multi-level image according to a coding scheme different between the edge blocks and non-edge blocks; and
a part classifying the input multi-level image into a halftone-dot part mainly including halftone dots and the other non-halftone-dot part,
wherein said coding part controls the coding scheme according to the result of classification of said classifying part.

25. A coding device comprising:
a part dividing an input multi-level image into a plurality of blocks, and determining whether each block is an edge block or a non-edge block according to edge degree thereof;
a part coding the input multi-level image according to a coding scheme different between the edge blocks and non-edge blocks; and
a part classifying the input multi-level image into a halftone-dot part mainly including halftone dots and the other non-halftone-dot part,
wherein said dividing part controls a determination threshold therefor according to the result of classification of said classifying part.

26. A coding device comprising:
a part dividing an input multi-level image into a plurality of blocks, and determining whether each block is an edge block or a non-edge block according to edge degree thereof;
a part coding the input multi-level image according to a coding scheme different between the edge blocks and non-edge blocks; and
a part classifying the input multi-level image into a halftone-dot part mainly including halftone dots and the other non-halftone-dot part,
wherein said dividing part controls a determination threshold thereof according to the result of classification of said classifying part and a set image characteristic mode.

27. A coding and decoding device comprising:
a part dividing an input multi-level image into a plurality of blocks, and determining whether each block is an edge block or a non-edge block according to edge degree thereof;
a part coding the input multi-level image according to a coding scheme different between the edge blocks and non-edge blocks;
a part classifying the input multi-level image into a halftone-dot part mainly including halftone dots and the other non-halftone-dot part; and
a part decoding coded data obtained from said step b),
wherein:
said coding part controls the coding scheme according to the result of classification of said classifying part; and
said decoding part controls a decoding scheme according to the result of classification of said classifying part.

28. The coding and decoding device as claimed in claim 27, wherein said coding part comprises a part restricting a frequency band of the image data on the non-edge block, and a part performing down-sampling on the image data having been processed by said restricting part.

29. The coding and decoding device as claimed in claim 27, wherein said decoding part comprises a part restricting a frequency band of the coded data on the non-edge block, and a part obtaining pixel values through interpolation operation therefrom.

30. The coding and decoding device as claimed in claim 28, wherein said restricting part controls filter coefficients applied according to a set image characteristic mode.

31. The coding and decoding device as claimed in claim 29, wherein said restricting part controls filter coefficients applied according to a set image characteristic mode.

32. A coding device comprising:
a part dividing an input multi-level image into a plurality of blocks, and determining whether each block is an edge block or a non-edge block according to edge degree thereof; and
a part coding the input multi-level image according to a coding scheme different between the edge blocks and non-edge blocks,
wherein said coding part, for the edge block, obtains an average of a maximum value and minimum value in pixel value on each block as a first code assignment threshold, subtracts a predetermined value from the first code assignment threshold so as to obtain the subtraction result as a second code assignment threshold, and performs coding by using the second code assignment threshold as a reference thereof.

33. The coding device as claimed in claim 32, further comprising a part determining whether an image region is a character image region mainly including a character, wherein said coding part performs coding by using the second code assignment threshold when the image region is the character image region, while otherwise using the first code assignment threshold.

34. The coding device as claimed in claim 32, further comprising a part controlling the predetermined value according to a set image characteristic mode.

* * * * *

UNITED STATES PATENT AND TRADEMARK OFFICE
CERTIFICATE OF CORRECTION

PATENT NO. : 6,996,278 B2  Page 1 of 1
APPLICATION NO. : 10/098413
DATED : February 7, 2006
INVENTOR(S) : Maki Ohyama et al.

It is certified that error appears in the above-identified patent and that said Letters Patent is hereby corrected as shown below:

On The Title Page: Item (56)
In the Foreign Patent Documents portion of the References Cited section, the following Japanese patent is added:

JP 2777379    05-01-1998

Signed and Sealed this

Third Day of April, 2007

JON W. DUDAS
*Director of the United States Patent and Trademark Office*